United States Patent
Tom et al.

(10) Patent No.: US 10,676,341 B2
(45) Date of Patent: Jun. 9, 2020

(54) LIQUID DISPENSING SYSTEMS WITH GAS REMOVAL AND SENSING CAPABILITIES

(71) Applicant: Entegris, Inc., Billerica, MA (US)

(72) Inventors: Glenn M. Tom, Bloomington, MN (US); Joseph Patrick Menning, Prior Lake, MN (US); Matthew Kusz, Bloomington, MN (US); Amy Koland, Eden Prairie, MN (US); Donald D. Ware, Woodbury, MN (US); Richard D. Chism, Round Rock, TX (US)

(73) Assignee: Entegris, Inc., Billerica, MA (US)

( * ) Notice: Subject to any disclaimer, the term of this patent is extended or adjusted under 35 U.S.C. 154(b) by 197 days.

(21) Appl. No.: 15/897,206

(22) Filed: Feb. 15, 2018

(65) Prior Publication Data
US 2018/0237285 A1     Aug. 23, 2018

Related U.S. Application Data

(63) Continuation of application No. 14/928,591, filed on Oct. 30, 2015, now abandoned, which is a
(Continued)

(51) Int. Cl.
*B65D 47/32* (2006.01)
*B67D 7/02* (2010.01)
(Continued)

(52) U.S. Cl.
CPC .......... *B67D 7/0261* (2013.01); *B65D 47/32* (2013.01); *B67D 7/0294* (2013.01); *B67D 7/72* (2013.01);
(Continued)

(58) Field of Classification Search
CPC .... B65D 47/32; B67D 7/0261; B67D 7/0294; B67D 7/72; B67D 7/76; C02F 1/001;
(Continued)

(56) References Cited

U.S. PATENT DOCUMENTS

| 3,631,654 A | 1/1972 | Riely et al. |
| 4,002,432 A | 1/1977 | Brice et al. |

(Continued)

FOREIGN PATENT DOCUMENTS

| CN | 101223100 A | 7/2008 |
| CN | 101881400 A | 11/2010 |

(Continued)

OTHER PUBLICATIONS

Mykrolis, "Fluorogard AT and ATX Disposable Filters", published 2004, pp. 1-4.

*Primary Examiner* — Lucas A Stelling
(74) *Attorney, Agent, or Firm* — Entegris, Inc.

(57) ABSTRACT

A dispensing assembly for a pressure dispense package includes a connector having separate and distinct liquid and extraction conduits, and having a pressurization gas conduit. A liner fitment adapter may include a longitudinal bore to receive a probe portion of a connector defining a liquid extraction conduit, and may include a lateral bore to enable removal of gas. Insertion of a connector into a dispensing assembly simultaneously makes fluidic connections between (a) a gas extraction conduit and a dispensing volume; (b) a liquid extraction conduit and the dispensing volume, and (c) a pressurization gas conduit and a space to be pressurized within a pressure dispense vessel.

6 Claims, 17 Drawing Sheets

Related U.S. Application Data continuation of application No. 13/520,557, filed as application No. PCT/US2011/020236 on Jan. 5, 2011, now abandoned.

(60) Provisional application No. 61/292,852, filed on Jan. 6, 2010.

(51) Int. Cl.
*B67D 7/72* (2010.01)
*B67D 7/76* (2010.01)
*C02F 1/20* (2006.01)
*C02F 1/00* (2006.01)

(52) U.S. Cl.
CPC ............... *B67D 7/76* (2013.01); *C02F 1/20* (2013.01); *C02F 1/001* (2013.01); *C02F 2209/40* (2013.01); *Y10T 137/2708* (2015.04)

(58) Field of Classification Search
CPC .. C02F 1/20; C02F 2209/40; Y10T 137/2708; B01D 19/0063
See application file for complete search history.

(56) References Cited

U.S. PATENT DOCUMENTS

| | | |
|---|---|---|
| 5,148,945 A | 9/1992 | Geatz |
| 5,217,053 A | 6/1993 | Foster et al. |
| 5,383,574 A | 1/1995 | Raphael |
| 5,526,956 A * | 6/1996 | Osgar .................. B67D 7/76 222/105 |
| 5,693,017 A | 12/1997 | Spears et al. |
| 5,803,137 A | 9/1998 | Shimotoyodome et al. |
| 5,908,056 A | 6/1999 | Shimotoyodome et al. |
| 5,957,328 A | 9/1999 | Osgar |
| 6,042,635 A | 3/2000 | Chung et al. |
| 6,065,638 A | 5/2000 | Terranova et al. |
| 6,077,356 A | 6/2000 | Bouchard |
| 6,089,027 A | 7/2000 | Wang et al. |
| 6,168,048 B1 | 1/2001 | Xu et al. |
| 6,206,240 B1 | 3/2001 | Osgar et al. |
| 6,264,064 B1 | 7/2001 | Birtcher et al. |
| 6,267,132 B1 | 7/2001 | Guarneri |
| 6,435,224 B2 | 8/2002 | Blatt et al. |
| 6,460,730 B1 | 10/2002 | Liedtke |
| 6,542,848 B1 | 4/2003 | Neeser et al. |
| 6,698,619 B2 | 3/2004 | Wertenberger |
| 6,732,945 B2 | 5/2004 | Dolechek |
| 6,733,250 B2 | 5/2004 | Yajima |
| 6,942,123 B2 | 9/2005 | Wertenberger |
| 7,029,094 B2 | 4/2006 | Nakamura |
| 7,172,096 B2 | 2/2007 | O'Dougherty |
| 7,188,644 B2 | 3/2007 | Kelly et al. |
| 7,607,823 B2 | 10/2009 | Kent |
| 7,810,679 B2 | 10/2010 | Wauters et al. |
| 8,322,571 B2 | 12/2012 | Hovinen et al. |
| 8,336,734 B2 | 12/2012 | Ware et al. |
| 8,507,382 B2 | 8/2013 | Hughes et al. |
| 8,518,483 B2 | 8/2013 | Spohn et al. |
| 9,073,028 B2 | 7/2015 | Hovinen et al. |
| 9,079,758 B2 | 7/2015 | O'Dougherty et al. |
| 9,120,616 B2 | 9/2015 | Ware et al. |
| 2004/0058453 A1 | 3/2004 | Free et al. |
| 2004/0069347 A1 | 4/2004 | Graves et al. |
| 2005/0087237 A1 | 4/2005 | O'Dougherty et al. |
| 2005/0224523 A1 | 10/2005 | O'Dougherty et al. |
| 2005/0279207 A1 | 12/2005 | O'Dougherty et al. |
| 2006/0146103 A1 | 7/2006 | Nakamura |
| 2009/0001019 A1 | 1/2009 | Frometa et al. |
| 2010/0112815 A1 | 5/2010 | O'Dougherty et al. |
| 2012/0291627 A1 | 11/2012 | Tom et al. |
| 2015/0078685 A1 | 3/2015 | Tom et al. |

FOREIGN PATENT DOCUMENTS

| | | |
|---|---|---|
| CN | 102101634 A | 6/2011 |
| CN | 102126696 A | 7/2011 |
| DE | 196 29 734 A1 | 1/1997 |
| EP | 0 128 556 A2 | 12/1984 |
| EP | 1 240 932 A2 | 9/2002 |
| EP | 1 896 359 A2 | 3/2008 |
| FR | 2126610 A5 | 10/1972 |
| JP | S51-129978 A | 11/1976 |
| JP | S59-228849 A | 12/1984 |
| JP | H05-103921 A | 4/1993 |
| JP | H05-319500 A | 12/1993 |
| JP | H09-29006 A | 2/1997 |
| JP | H09-66228 A | 3/1997 |
| JP | 2000-015082 A | 1/2000 |
| JP | 2000-167381 A | 6/2000 |
| JP | 2001-503106 A | 3/2001 |
| JP | 2001-276832 A | 10/2001 |
| JP | 2002-273113 A | 9/2002 |
| JP | 2002-167813 A | 11/2002 |
| JP | 2003-103157 A | 4/2003 |
| JP | 2003-170004 A | 6/2003 |
| JP | 2005-058842 A | 3/2005 |
| JP | 2005-205349 A | 8/2005 |
| JP | 2007-258367 A | 10/2007 |
| JP | 2008-043855 A | 2/2008 |
| JP | 2008-539078 A | 11/2008 |
| JP | 2008-539145 A | 11/2008 |
| JP | 2008-542147 A | 11/2008 |
| JP | 2009-517585 A | 4/2009 |
| JP | 2009-206114 A | 9/2009 |
| JP | 2009-539606 A | 11/2009 |
| KR | 2008-0039373 A | 5/2008 |
| KR | 2010-0112650 A | 10/2010 |
| MY | 142284 A | 11/2010 |
| WO | 95/03245 A1 | 2/1995 |
| WO | 98/27247 A1 | 6/1998 |
| WO | 00/54724 A2 | 9/2000 |
| WO | 03/093109 A1 | 11/2003 |
| WO | 2004/050537 A2 | 6/2004 |
| WO | 2005/100203 A2 | 10/2005 |
| WO | 2006/116572 A2 | 11/2006 |
| WO | 2006/133026 A2 | 12/2006 |
| WO | 2007/061967 A2 | 5/2007 |
| WO | 2007/079551 A1 | 7/2007 |
| WO | 2007/146892 A2 | 12/2007 |
| WO | 2009/076276 A2 | 6/2009 |
| WO | 2011/085012 A2 | 7/2011 |

* cited by examiner

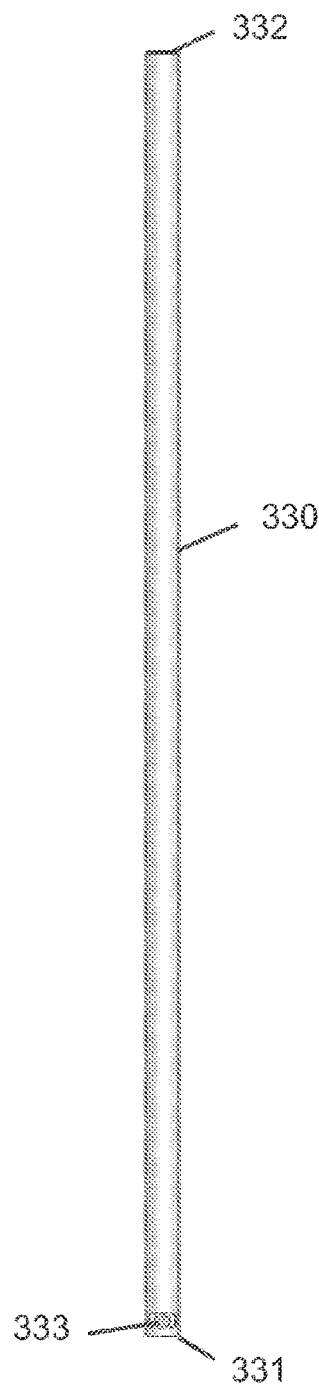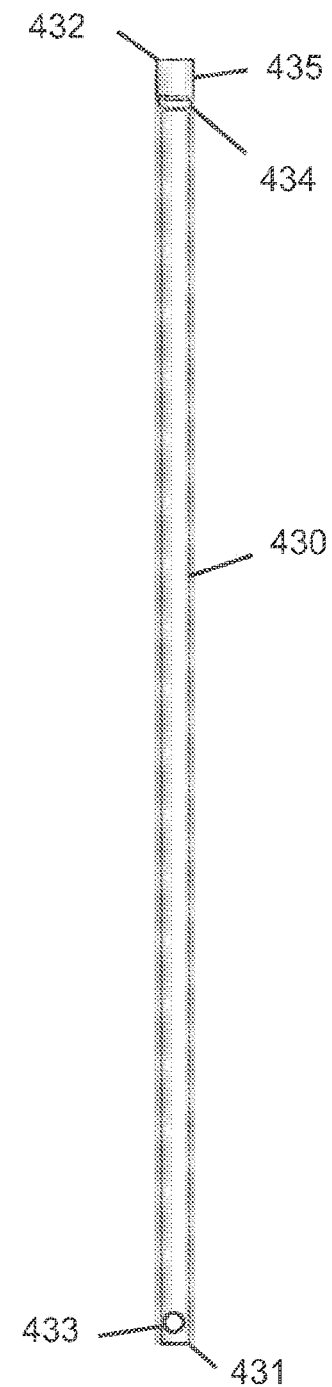
FIG. 6B                  FIG. 7B

LIQUID DISPENSING SYSTEMS WITH GAS REMOVAL AND SENSING CAPABILITIES

CROSS-REFERENCE TO RELATED APPLICATION

The present application is a continuation of U.S. patent application Ser. No. 14/928,591, filed Oct. 30, 2015, which is a continuation of U.S. patent application Ser. No. 13/520, 557, filed Jul. 27, 2012, which is a § 371 of International Patent Application No. PCT/US2011/020236, filed Jan. 5, 2011, which claims the benefit of U.S. Provisional Patent Application No. 61/292,852 filed Jan. 6, 2010, all of which are hereby incorporated by reference herein in their entireties.

TECHNICAL FIELD

The present invention relates to dispensing systems, such as may be utilized to dispense fluid materials for use thereof, and related sensing systems. In a specific aspect, the invention relates to pressure-dispensing systems, wherein liquid or other fluid material is discharged from a source vessel by displacement with a pressurized medium, e.g., air or liquid, and to associated aspects relating to fabrication, sensing, operational processes, and deployment of such systems.

BACKGROUND

In many industrial applications, chemical reagents and compositions are required to be supplied in a high purity state, and specialized packaging has been developed to ensure that the supplied material is maintained in a pure and suitable form, throughout the package fill, storage, transport, and ultimate dispensing operations.

In the field of microelectronic device manufacturing, the need for suitable packaging is particularly compelling for a wide variety of liquids and liquid-containing compositions, since any contaminants in the packaged material, and/or any ingress of environmental contaminants to the contained material in the package, can adversely affect the microelectronic device products that are manufactured with such liquids or liquid-containing compositions, rendering the microelectronic device products deficient or even useless for their intended use.

As a result of these considerations, many types of high-purity packaging have been developed for liquids and liquid-containing compositions used in microelectronic device manufacturing, such as photoresists, etchants, chemical vapor deposition reagents, solvents, wafer and tool cleaning formulations, chemical mechanical polishing compositions, color filtering chemistries, overcoats, liquid crystal materials, etc.

One type of high-purity packaging that has come into such usage includes a rigid, substantially rigid, or semi-rigid overpack containing a liquid or liquid-based composition in a flexible liner or bag that is secured in position in the overpack by retaining structure such as a lid or cover. Such packaging is commonly referred to as "bag-in-can" (BIC), "bag-in-bottle" (BIB) and "bag-in-drum" (BID) packaging. Packaging of such general type is commercially available under the trademark NOWPAK from Advanced Technology Materials, Inc. (Danbury, Conn., USA).

Preferably, a liner comprises a flexible material, and the overpack container comprises a wall material that is substantially more rigid than said flexible material. Rigid or semi-rigid overpack of the packaging may be formed (for example) of a high-density polyethylene or other polymer or metal, and the liner may be provided as a pre-cleaned, sterile collapsible bag of a polymeric film material, such as polytetrafluoroethylene (PTFE), low-density polyethylene, medium-density polyethylene, PTFE-based laminates, polyamide, polyester, polyurethane, or the like, selected to be inert to the material (e.g., liquid) to be contained in the liner. Multilayer laminates comprising any of the foregoing materials may be used. Exemplary materials of construction of a liner further include: metalized films, foils, polymers/copolymers, laminates, extrusions, co-extrusions, and blown and cast films. Liner-based packaging of such general type is commercially available under the trademark NOWPAK from Advanced Technology Materials, Inc.

In use of liner-based packaging to dispense liquids and liquid-based compositions, the liquid or composition is dispensed from the liner by connecting a dispensing assembly including a dip tube or short probe to a port of the liner, with the dip tube being immersed in the contained liquid. Fluid (e.g., gas) pressure is applied to the exterior surface of the liner (i.e., in the space between the liner and a surrounding overpack container), to progressively collapse the liner and thereby force liquid through the dispensing assembly for discharge to associated flow circuitry to flow to an end-use tool or site. Such operation may be called liner-based pressure dispensing. Use of a liner to contain a liquid to be dispensed prevents direct contact with pressurized gas arranged to exert pressure against the liner.

A simplified schematic of a conventional liner-based package 60 is provided in FIG. 1A, showing a liner 62 having (surrounding) an interior volume containing a liquid 68, with the liner 62 disposed within an overpack container 61. An interstitial space 63 is provided between the liner 62 and the overpack container 61, and is in fluid communication with a pressurized gas source 65. Addition of pressurized gas to the interstitial space 63 compresses the liner 62 to cause liquid 68 to flow through a diptube 64 out of the container to a process tool or other point of use 66.

Headspace (extra air or gas at the top of a liner) and microbubbles present a significant process problem for liquid dispensing from liner-based packages, such as in flat panel display (FPD) and integrated circuit (IC) manufacturing facilities. Headspace gas may derive from the filling operation, in which the package is less than completely filled with the liquid. Less than complete filling of the package may be necessary in order to provide a headspace as an expansion volume to accommodate changes in the ambient environment of the package, such as temperature changes that cause the liquid to expand during transport of the package to a location where the package will be placed in dispensing operation.

While maintenance of headspace in a liner-based package may be desirable during package transport, such headspace may be detrimental to fluid dispensing and/or use. Gas from the headspace may become entrained in the liquid being dispensed from a liner-based pressure package and produce a heterogeneous, a multi-phase dispensed fluid stream that is deleterious to the process or product for which the dispensed liquid is being utilized. Further, the presence of gas from the headspace in the dispensed liquid can result in malfunction or error in operation of fluid flow sensors, flow controllers, and the like.

A related problem, incident to the use of packages containing liquid compositions, is permeation or in-leakage of gas into the contained liquid and solubilization and bubble formation in the liquid. In the case of liner-based packages, gases exterior to the liner may permeate through the liner (e.g., through slightly permeable film materials, seams between liner panels, and/or pinholes formed in liner panels) into the contained liquid. Where liner-based packages are utilized for pressure dispense operation, the pressurizing gas itself, e.g., air or nitrogen, may permeate through the liner material and become dissolved in the liquid in the liner. When the liquid subsequently is dispensed, pressure drop in the dispensing lines and downstream instrumentation and equipment may cause liberation of formerly dissolved gas, resulting in the formation of bubbles in the stream of dispensed liquid, with consequent adverse effect analogous to those resulting from entrained headspace gas. It would therefore be desirable to remove headspace gas prior to initial dispensation. It would also be desirable to permit continued removal of liberated gas after liquid dispensation has commenced. It would further be desirable to accomplish gas removal rapidly while reducing the potential for microbubble formation.

In the manufacture of semiconductor products and other microelectronic products, the presence of bubbles, even those of microscopic size (microbubbles), can result in an integrated circuit or flat-panel display being deficient or even useless for its intended purpose. It therefore is imperative for all extraneous gas to be removed from the liquid utilized for the manufacture of such products.

In use of a typical liner-based package, the package is pressurized and a venting valve is opened to allow headspace gas to flow out of the liner. After headspace gas is exhausted, liquid enters the headspace gas discharge line, a gas venting valve is closed, and another valve is opened to dispense only liquid in a liquid discharge line. When the package signals an empty detect condition, e.g., by monitoring of pressure of the dispensed fluid, and detection of a drop in the pressure as a function of time, the connector or other coupling device joined to the vessel containing the liner can be removed from the exhausted vessel, and placed on a fresh (e.g., full) container, to provide for continued dispensing operation. Due to presence of liquid in the headspace removal line, a timer may be used to bypass the liquid sensor until headspace gas arrives again. Thereafter, liquid reenters the vent line and the sensor is "re-activated" with the timer to close the vent valve. Such arrangement, however, is susceptible to failure modes involving occurrence of the following events: (i) the timer is not set correctly and transmits a false signal indicating that the headspace has been removed; (ii) headspace varies from one filled package to another, and settings that are selected for one package are not appropriate for another, so that the headspace gas is not correctly removed; (iii) bubbles present in the headspace gas vent line create a false indication of headspace gas removal; and (iv) remaining (previously present) liquid in the headspace vent line can give a false indication of headspace gas removal.

Additionally, in the storage and dispensing of liquids and liquid-based compositions from liner packages, it is desirable to manage the dispensing operation so that the depletion or approach to depletion of the dispensed material is detected so that termination of a downstream operation, or switchover to a fresh package of material, is able to be timely effected. Reliability in end-stage monitoring of the dispensing operation, and particularly in detection of an empty or approaching empty condition, therefore enables optimum utilization of liner packages, and is a desired objective for design and implementation of such packaging. It can be difficult to reliably and economically detect an empty condition or approach to empty condition indicative of exhaustion of liquid from a package or reservoir for dispensation to a downstream process. Upon completion of detection, a second source of liquid is preferred to be automatically switched over, thereby eliminating any additional downstream operational concerns. For example, a switchover reservoir adapted to supply fluid deriving from said pressure dispense package may be utilized for dispensing when a pressure dispense package is emptied or nearly emptied of said fluid.

Another problem associated with packages from which liquids are dispensed for industrial processes such as manufacture microelectronic device products, relates to the fact that the liquids in many cases are extraordinarily expensive, as specialty chemical reagents. It therefore is necessary from an economic perspective to achieve as complete a utilization of the liquid from a package as possible, so that no substantial residual amount of liquid remains in the package after the dispensing operation has been completed. For such reason, it is desirable to monitor the dispensing operation in a manner that permits determination of the endpoint of such operation. There is a continuing effort in the art to provide efficient endpoint detectors that minimize the amount of liquid residuum in the package.

Certain problems with liner-based dispensing packages have been addressed by systems and methods disclosed in International Patent Application Publication No. WO/2007/146892 ("the '892 publication"), which is assigned to Advanced Technology Materials, Inc., shares several common inventors with the present application, and is hereby incorporated by reference herein. The '892 publication discloses highly integrated connectors that provide the following utilities: liquid dispensing, headspace gas removal, pressure relief, pressure measurement, and reservoir gas/liquid level control (i.e., via sensing and valving). The accompanying FIG. 1 (which is adapted from FIG. 20A of the '892 publication) provides a cross-sectional view of at least a portion of such a connector 1 including an integrated reservoir 16 and a sensor 55 proximate to an interface between liquid 58 and gas (i.e., disposed above the liquid 58) within the reservoir 16, to sense a condition in which a gas pocket has accumulated along an upper portion of the reservoir 16, to permit gas to be periodically and automatically expelled from the reservoir 16 during dispensing operation. Although not fully illustrated in FIG. 1, the connector 1 includes a probe (in which a central conduit 6 is defined) arranged to extend downward into a liner. The central conduit 6 extends in the middle of a container and/or liner (not shown) and the reservoir 16 disposed within the body 24 of the connector 1. The central conduit 6 has a central bore accommodating upward gas/liquid flow, and an open upper end 10 allowing the upflowing gas/liquid during dispensing operation to overflow the upper end 10 and issue into the reservoir 16. A pressurized gas supply line 3 is used to supply pressurized gas to a space between a liner and an overpack container to promote dispensation of the liquid contents of the liner into the connector 1. A pressure sensing line 21 and pressure sensor 22 are arranged to sense pressure in the central conduit 6. A gas conduit 18, which is in fluid communication with the reservoir 16 at an upper portion thereof, is communicatively coupled to an actuatable gas outlet valve 34. A corresponding liquid outlet conduit 19 is in fluid communication with the reservoir 16 at a lower portion thereof and is communicatively coupled to an actuatable liquid outlet valve 30.

Although integrated reservoir systems disclosed in the '892 publication achieve their intended purpose, various considerations have demonstrated unmet needs for modifications or enhancements to such systems.

Liner-based pressure dispensing containers are often installed in dedicated material dispensing enclosures or cabinets with numerous other fluid lines and fluid control components. Presence of an integrated reservoir and other components requires presence of significant space (volume) above a pressure dispensing container, and also requires multiple electrical and fluid connections to be made within that space. It would be desirable to reduce volumetric requirements immediately proximate to pressure dispensing containers, and also reduce the number of electrical and fluid other connections that need to be made immediately proximate to such containers.

In case a liner within a pressure dispense package according to the '892 publication should fail, it may be difficult or impossible to continue dispensation of a liquid composition with the liner due to flow of gas from a pressurized gas inlet through the central conduit (e.g., central conduit 6 as illustrated in the accompanying FIG. 1), to the exclusion of liquid flow through such central conduit. It would be desirable to provide for continued flow of liquid through a connector of a liner-based pressure dispense assembly even if the integrity of the liner should be compromised.

Sole reliance on gravimetric separation between liquid and gas within a reservoir such as disclosed in the '892 publication may not provide ample separation in case very high viscosity liquids and/or high liquid dispensing rates are used. That is, depending on the liquid viscosity and flow rate in a gravimetric reservoir separation system, upward motion of gas bubbles in a reservoir (i.e., toward a gas outlet arranged at an upper portion thereof) may not be sufficiently fast to overcome downward motion of liquid in the reservoir (i.e., toward a liquid outlet arranged at a bottom portion thereof), such that some bubbles may be undesirably entrained in flow of liquid through the liquid outlet associated with the reservoir. It would be desirable to ensure that gas bubbles are not entrained in liquid dispensed to a point of use over a wide range of liquid viscosities and liquid flow rates.

Prior methods of joining a diptube to a mating (e.g., recess-defining) structure have occasionally led to tube cracking. Certain joining methods have involved tube flaring and other techniques, which are also labor intensive. It would be desirable to accommodate mating of a diptube to a mating structure while avoiding the foregoing issues.

When dispensing highly opaque liquids (e.g., pigmented color filter materials and used for coating flat panels in the manufacture of display monitors, and similar fluids), conventional systems and methods for detecting presence or absence of liquid may be insufficient, since optical measurement techniques may be ineffective and capacitance measurement techniques may be insufficiently sensitive and/or reliable as applied to such liquids. It would be desirable to enhance reliability of detecting opaque fluids for dispensing of same to desired points of use, such as manufacturing process tools for flat panel displays.

When dispensing fluid from a liner-based pressure dispense package including an overpack container containing a thin film-based liner defining an interior volume arranged to contain source material (including liquid), gas trapped within folds of a liner may be released during dispensation and may be dissolved in the source material. That is, conventional liners may embody two-dimensional designs (e.g., including front and back panels, optionally including side and/or end panels) that are peripherally bonded to one another) that are not conformal to the shape of an associated overpack container, and gas may be trapped in folds of such a liner when the liner is inflated and filled. Release of such gas during pressure dispensing enables such gas to be dissolved in source material. When the source material is saturated with gas, the source material or container (containing source material) must be replaced to avoid dispensation of source material containing gas bubbles. Such replacement may be necessary long before source material is exhausted from the pressure dispense container, thereby wasting source material and potentially reducing utilization of a process tool while a pressure dispense container is changed. Based on testing and simulation, Applicants have been determined that the maximum amount of fold gas at the upper limit should not surpass 500 ml for a 200 liter liner.

FIG. 10 shows dissolved gas saturation pressure (in Pascals) versus time (in days) for simulations modeling gas released from folds during pressure dispense of fluid from seven different 200 liter collapsible film-based container liners (e.g., simulations including a liner with 0 cm radius fold containing 0 ml of fold gas, a 1 cm radius fold containing 17 ml of fold gas, 2 cm radius fold containing 133 ml of fold gas, a 3 cm radius fold containing 447 ml of fold gas, 4 cm radius fold containing 1061 ml of fold gas, a single Z-fold configuration, and a double Z-configuration, respectively). The volume of each bubble is calculated assuming the bubble is under atmospheric pressure, while the radius of each bubble is calculated assuming the bubble is subjected to 30 psi dispense pressure. As shown in FIG. 10, a double Z-fold liner configuration tends to trap more gas (resulting in higher gas saturation pressure) than a single Z-fold liner. Based on the simulation represented in FIG. 10, liquid source material becomes saturated (e.g., with 500 ml of) fold gas following dispensation of about 88% of the source material.

Applicants have determined that fold gas is not released from folds of a pressure dispensing liner until very late in the dispensation process. This means a liner with relatively high rigidity and poor conformance to an overpack container will have folds and be susceptible to the dissolved gas. FIG. 11 shows the release of fold gas with respect to time for a first liner with a single Z-fold configuration (lower curve) and for a second liner with a double Z-fold configuration (upper curve). Such figure shows that a larger amount of fold gas is trapped within a liner having a double Z-fold configuration than in a liner having a single Z-fold configuration. FIG. 11 shows that a substantial amount of fold gas remains within a liner during the last 25 percent of the dispense process. The issue is also exacerbated by the high ratio of gas to remaining source material within the liner near the end of the dispense process (when the majority of the liquid source material has been depleted from the liner).

Whether or not in conjunction with presence of fold gas, presence of any pin holes or larger opening (i.e., a breach) in a liner tend to allow ingress of pressurization gas into the liner and gas headspace, thereby hastening attainment of (undesirable) saturation of source material with gas.

It would be desirable to manage the effects of fold gas and the effects of a failed liner in pressure dispensing of source material. It would be desirable to increase the percentage of dispensed source material without reaching the gas saturation level (e.g., to enable dispensation of a very high percentage (e.g., >98% or >99%) of source material before a gas-saturated condition is reached) in order to reduce waste of source material and extend the time between replenishment of source material containers.

The art therefore continues to seek improvements in dispensing packages, dispensing systems, dispensing methods, and associated sensing apparatuses.

SUMMARY

The present invention relates to fluid dispensing systems and methods that overcome various issues present in conventional systems.

In one aspect, the invention relates to a fluid dispensing system comprising: a pressure dispense package including a vessel with an interior volume arranged to contain a fluid for pressure dispensing, the vessel including a vessel opening; and a dispensing assembly adapted to mate with the vessel proximate to the vessel opening, the dispensing assembly including: a gas extraction opening exposed to the interior volume; a liquid extraction opening exposed to the interior volume; a gas extraction conduit extending between the gas extraction opening and a gas outlet; and a liquid extraction conduit extending between the liquid extraction opening and a liquid outlet; wherein the gas extraction conduit is distinct from the liquid extraction conduit.

In another aspect, the invention relates to a connector arranged for dispensing liquid-containing source material from a liner-based pressure dispense package including an overpack container containing a liner defining an interior volume arranged to contain said source material, the connector comprising a gas extraction conduit arranged to extract gas from the interior volume, a liquid extraction conduit arranged to extract liquid from the interior volume, and a pressurization gas conduit arranged to supply gas to an interstitial space between the liner and the overpack container.

In a further aspect, the invention relates to structure arranged for use with a pressure dispense package including a vessel with an interior volume arranged to contain a fluid for pressure dispensing, the vessel including a vessel opening, wherein the structure comprises: a body defining a longitudinal bore and a gas extraction opening, wherein a lower portion of the longitudinal bore is arranged to receive a diptube arranged to extend into the interior volume and having a liquid extraction opening, and an upper portion of the longitudinal bore is arranged to receive a connector, the connector defining a gas extraction conduit in fluid communication with a gas outlet and defining a liquid extraction conduit in fluid communication with a liquid outlet; wherein the gas extraction opening is exposed to the interior volume and is in fluid communication with the gas extraction conduit, and the liquid extraction opening is exposed to the interior volume and is in fluid communication with the liquid extraction conduit.

A further aspect of the invention relates to method utilizing a pressure dispense package including a vessel with an interior volume arranged to contain fluid for pressure dispensing, the method comprising: inserting a connector defining a gas extraction conduit and a liquid extraction conduit into a dispensing assembly defining (i) a longitudinal bore arranged to permit fluid communication with a liquid extraction opening exposed to the interior volume and (ii) a lateral bore arranged to permit fluid communication with a gas extraction opening exposed to the interior volume, wherein said insertion of the connector into the dispensing assembly simultaneously effects fluid communication (a) between the liquid extraction conduit and the liquid extraction opening and (b) between the gas extraction conduit and the gas extraction opening; extracting gas from the interior volume through the gas extraction opening and the gas extraction conduit; and pressure dispensing liquid from the interior volume through the liquid extraction opening and the liquid extraction conduit.

A still further aspect of the invention relates to a gas removal apparatus adapted to remove gas from a liquid stream, the apparatus comprising: a reservoir body defining an interior volume including therein a filtration medium adapted to permit passage of liquid but prevent passage of bubbles, the reservoir body having a fluid inlet, having a liquid outlet arranged to receive liquid passing through the filtration medium, and having a gas outlet arranged to receive gas accumulated from bubbles prevented from passing through the filtration medium; and a pressure transducer in sensory communication with the interior volume and arranged to generate an output signal indicative of pressure within the interior volume.

Yet another aspect relates to a method comprising: (a) venting gas from within an interior volume of a collapsible liner disposed in an overpack container of a pressure dispense package, the liner further containing a liquid, wherein the gas is vented through a gas extraction conduit and a gas outlet defined in a dispensing assembly; (b) supplying pressurized gas to an interstitial space between the liner and the overpack container to compress the liner and thereby dispense liquid from the interior volume through a liquid extraction conduit and a liquid outlet defined in the dispensing assembly, wherein the liquid extraction conduit is distinct from the gas extraction conduit; (c) flowing liquid received from the liquid output through a reservoir body disposed downstream of the dispensing assembly, wherein the reservoir body defines an interior volume including therein a filtration medium adapted to permit passage of liquid but prevent passage of bubbles, the reservoir body having a reservoir liquid outlet arranged to receive liquid passing through the filtration medium, and having a reservoir gas outlet arranged to receive gas accumulated from bubbles prevented from passing through the filtration medium; and (d) venting gas from the reservoir gas outlet.

Another aspect relates to an apparatus adapted to detect presence of fluid or change in phase of flowing fluid within a fluid circuit, the apparatus comprising: a first thermistor in sensory communication with the fluid at a first location within the fluid circuit, the first thermistor arranged to be driven at a first current level sufficient to cause self-heating of the first thermistor upon exposure of a sensing portion thereof to gas; a second thermistor in sensor communication with the fluid at a second location within the fluid circuit, the second thermistor arranged to be driven at a second current level that is substantially lower than the first current level; a signal processing element arranged to receive a first output signal of the first thermistor and a second output signal of the second thermistor, and to determine presence of fluid or change in phase of flowing fluid within the fluid circuit based on comparison of the first output signal and the second output signal.

Yet another aspect relates to a method for sensing presence of fluid or change in phase of flowing fluid within a fluid circuit, utilizing a first thermistor in sensory communication with the fluid at a first location within the fluid circuit and utilizing a second thermistor in sensory communication with the fluid at a second location within the fluid circuit, the method comprising: driving the first thermistor at a first current level sufficient to cause self-heating of the first thermistor upon exposure of a sensing portion thereof to gas; driving the second thermistor at a second current level that is substantially lower than the first current level; and comparing a first output signal of the first thermistor and a second output signal of the second thermistor to determine presence of fluid or change in phase of flow fluid within the fluid circuit based on such comparison.

Still another aspect relates to an apparatus adapted to detect presence of fluid or change in phase of flowing fluid within a fluid circuit, the apparatus comprising: a heating element arranged to dissipate heat into fluid at a first location within the fluid circuit; a first sensing element arranged in sensory communication with the first heating element and the fluid, and adapted to generate a first sensing element output signal correlative of temperature of the first heating element; a second sensing element arranged in sensory communication with the fluid at a second location within the fluid circuit, and adapted to generate a second sensing element output signal correlative of temperature of the fluid at the second location; and a signal processing element arranged to receive the first sensing element output signal and the second sensing element output signal, and to determine presence of fluid or change in phase of flowing fluid within the fluid circuit based on comparison of the first sensing element output signal and the second sensing element output signal.

Another aspect relates to a fluid dispensing system arranged for dispensation of fluid to a point of use, the fluid dispensing system comprising: a first pressure dispense apparatus including a first vessel with a first interior volume arranged to contain a fluid for pressure-mediated dispensing; a second pressure dispense apparatus including a second vessel with a second interior volume arranged to contain fluid for pressure-mediated dispensing; at least one ventable reservoir arranged to receive fluid from at least one of the first interior volume and the second interior volume; at least one sensing element arranged to generate an output signal correlative of dispensation of a desired amount of fluid from, or correlative of an approach to gas saturation of fluid dispensed by, the first pressure dispense apparatus; at least one control element arranged to dispense fluid from the second pressure dispense apparatus for combining fluid dispensed from the second pressure dispense apparatus with fluid dispensed from the first pressure dispense apparatus, responsive to the output signal or signal derived from the output signal; and a dispensation conduit arranged to receive fluid dispensed from the first pressure dispense apparatus and to receive fluid from the second pressure dispense apparatus, and to convey said fluid to the point of use.

Yet another aspect relates to a method of dispensing fluid, the method comprising: dispensing fluid from a first pressure dispense apparatus comprising a first vessel defining a first interior volume, and removing gas from the fluid dispensed from the first pressure dispense apparatus; sensing a condition and generating an output signal correlative of dispensation of a desired amount of fluid from, or correlative of an approach to gas saturation of fluid dispensed by, the first pressure dispense apparatus; responsive to the output signal or a signal derived from the output signal, dispensing fluid from a second pressure dispense apparatus comprising a second vessel defining an interior volume, and removing gas from the fluid dispensed from the second pressure dispense apparatus; and combining a flow of fluid dispensed from the second pressure dispense apparatus with a flow of fluid dispensed from the first pressure dispense apparatus, for dispensation of the combined flow to a point of use.

In another aspect, any one or more features of the foregoing aspects and/or any other aspects and features disclosed herein may be combined for additional advantage.

Other aspects, features and embodiments of the invention will be more fully apparent from the ensuing disclosure and appended claims.

BRIEF DESCRIPTION OF THE DRAWINGS

FIG. 6B is a side elevation view of a diptube suitable for use with the liner fitment adapter illustrated in FIG. 6A.

FIG. 7B is a side elevation view of a diptube suitable for use with the liner fitment adapter illustrated in FIG. 7A.

DETAILED DESCRIPTION

Figure 1A:
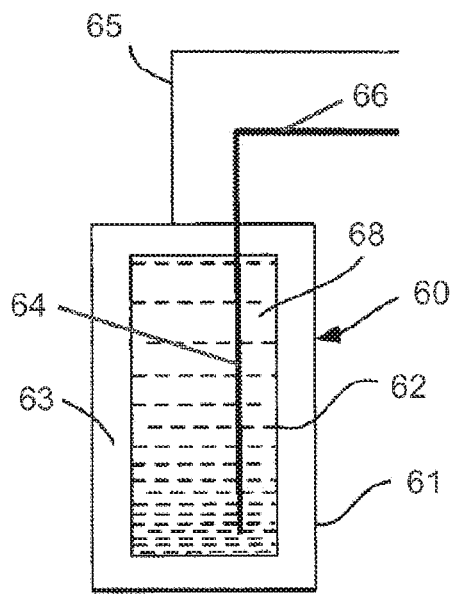
FIG. 1A is a simplified schematic side cross-sectional view of a liner-based pressure dispense package in the related art, as disclosed in U.S. Pat. No. 7,172,096.
Figure 1B:
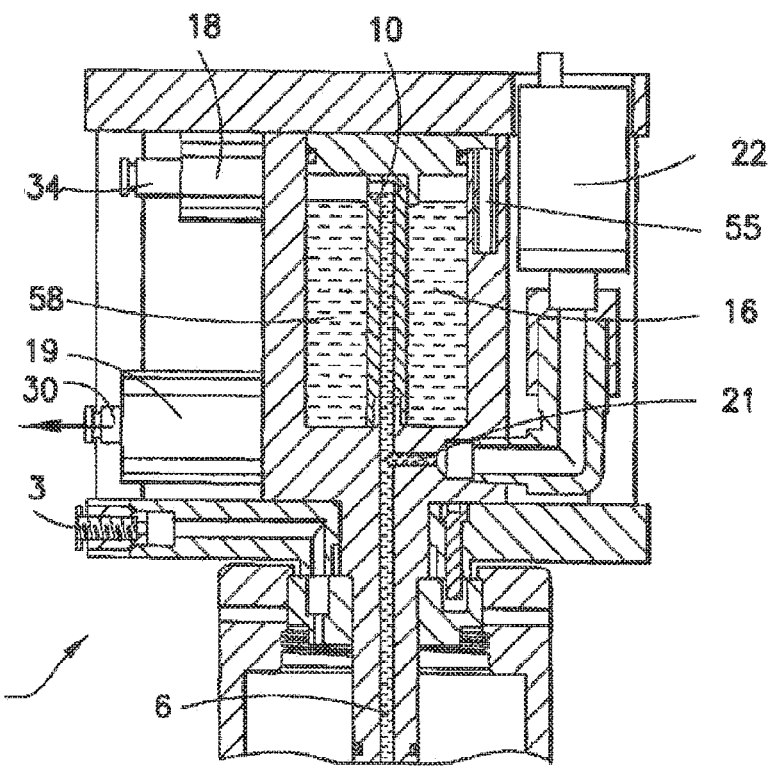
FIG. 1B is a cross-sectional view of at least a portion of a reservoir-containing connector for a liner-based pressure dispense package in the related art, as disclosed in International Patent Application Publication No. WO/2007/146892.

The present invention relates in certain aspects to improved dispensing systems including capability to remove bubbles and entrained gas from liquid and liquid-containing source materials subject to pressure dispensation. In a specific aspect, the invention relates to a liner-based liquid containment systems for storage and dispensing of chemical reagents and compositions, e.g., high purity liquid reagents and chemical mechanical polishing compositions used in the manufacture of microelectronic device products.

In the use of liner-based packages for storage and dispensing of fluid materials, wherein the liner is mounted in a rigid or semi-rigid outer vessel, the dispensing operation may involve the flow of a pressure-dispense gas into the vessel, exteriorly of the liner, so that the pressure exerted by the gas forces the liner to progressively be compacted so that the fluid material in the liner in turn is forced to flow out of the liner. The thus-dispensed fluid material may be flowed to piping, manifolding, through connectors, valves, etc. to a locus of use, e.g., a fluid-utilizing process tool.

Such liner-based liquid containment systems can be employed for storage and dispensing of chemical reagents and compositions of widely varied character. Although the invention is hereafter described primarily with reference to storage and dispensing of liquid or liquid-containing compositions for use in the manufacture of microelectronic device products, it will be appreciated that the utility of the invention is not thus limited, but rather the invention extends to and encompasses a wide variety of other applications and contained materials.

Although the invention is discussed hereinafter with reference to specific embodiments including various liner-based packages and containers, it will be appreciated that various of such embodiments, e.g., as directed to pressure-dispense arrangements or other features of the invention, may be practiced in liner-less package and container systems.

The term "microelectronic device" as used herein refers to resist-coated semiconductor substrates, flat-panel displays, thin-film recording heads, microelectromechanical systems (MEMS), and other advanced microelectronic components. The microelectronic device may include patterned and/or blanketed silicon wafers, flat-panel display substrates or polymer substrates. Further, the microelectronic device may include mesoporous or microporous inorganic solids.

In liner packaging of liquids and liquid-containing compositions (hereafter referred to as liquid media), it is desirable to minimize the headspace of the liquid medium in the liner. The headspace is the volume of gas overlying the liquid medium in the liner.

The liner-based liquid media containment systems of the present invention have particular utility in application to liquid media used in the manufacture of microelectronic device products. Additionally, such systems have utility in numerous other applications, including medical and pharmaceutical products, building and construction materials, food and beverage products, fossil fuels and oils, agriculture chemicals, etc., where liquid media or liquid materials require packaging.

As used herein, the term "zero headspace" in reference to fluid in a liner means that the liner is totally filled with liquid medium, and that there is no volume of gas overlying liquid medium in the liner.

Correspondingly, the term "near zero headspace" as used herein in reference to fluid in a liner means that the liner is substantially completely filled with liquid medium except for a very small volume of gas overlying liquid medium in the liner, e.g., the volume of gas is less than 5% of the total volume of fluid in the liner, preferably being less than 3% of the total volume of fluid, more preferably less than 2% of the total volume of fluid and most preferably, being less than 1% of the total volume of fluid (or, expressed another way, the volume of liquid in the liner is greater than 95% of the total volume of the liner, preferably being more than 97% of such total volume, more preferably more than 98% of such total volume, even more preferably more than 99% of such total volume, and most preferably more than 99.9% of such total volume).

The greater the volume of the headspace, the greater the likelihood that the overlying gas will become entrained and/or solubilized in the liquid medium, since the liquid medium will be subjected to sloshing, splashing and translation in the liner, as well as impact of the liner against the rigid surrounding container during transportation of the package. This circumstance will in turn result in the formation of bubbles (e.g., microbubbles) and particulates in the liquid medium, which degrade the liquid medium, and render it potentially unsuitable for its intended purpose. For this reason, headspace is desired to be minimized and preferably eliminated (i.e., in a zero or near-zero headspace conformation) with complete filling of the interior volume of the liner with liquid medium at the point of use. The package has to be shipped with some headspace gas in order to accommodate expansion of the contained material during shipment (as a result of temperature variation). Desirable systems according to the present invention therefore are arranged to remove the headspace gas at near atmospheric conditions after the package is coupled to a tool via dispensing flow circuitry. At atmospheric conditions, the gas is released from the chemical reagent and can easily be purged from the system before dispense of liquid to the tool.

The package includes a dispensing port that is in communication with the liner for dispensing of material therefrom. The dispensing port in turn is coupled with a suitable dispensing assembly. The dispensing assembly can take any of a variety of forms, e.g., an assembly including a probe or connector with a dip tube that contacts material in the liner and through which material is dispensed from the vessel. The package can be a large-scale package, wherein the liner has a capacity in a range of from 1 to 2000 or more liters of material.

In a pressure dispense mode, the liner-based package can be coupled with a pressurized gas source, such as a pump, compressor, a compressed gas tank, etc.

The dispensing assembly in one embodiment is adapted for coupling with flow circuitry, e.g., flow circuitry of a microelectronic device manufacturing facility using a chemical reagent supplied in the liner of the package. The semiconductor manufacturing reagent may be a photoresist or other high-purity chemical reagent or specialty reagent.

In one embodiment, a liner may be formed from tubular stock material. By the use of a tubular stock, e.g., a blown tubular polymeric film material, heat seals and welded seams along the sides of the liner are avoided. The absence of side welded seams may be advantageous to better withstand forces and pressures that tend to stress the liner, relative to liners formed of flat panels that are superimposed and heat-sealed at their perimeter.

A liner preferably is a single-use, thin membrane liner, whereby it can be removed after each use (e.g., when the container is depleted of the liquid contained therein) and replaced with a new, pre-cleaned liner to enable the reuse of the overall container. Such a liner is preferably free of components such as plasticizers, antioxidants, UV stabilizers, fillers, etc. that may be or become a source of contaminants, e.g., by leaching into the liquid contained in the liner, or by decomposing to yield degradation products that have greater diffusivity in the liner and that migrate to the surface and solubilize or otherwise become contaminants of the liquid in the liner.

Preferably, a substantially pure film is utilized for the liner, such as virgin (additive-free) polyethylene film, virgin polytetrafluoroethylene (PTFE) film, or other suitable virgin polymeric material such as polyvinylalcohol, polypropylene, polyurethane, polyvinylidene chloride, polyvinylchloride, polyacetal, polystyrene, polyacrylonitrile, polybutylene, etc. More generally, the liner may be formed of laminates, co-extrusions, overmold extrusion, composites, copolymers and material blends, with or without metallization and foil.

The thickness of the liner material can be any suitable thickness, e.g., in a range from about 1 mils (0.001 inch) to about 120 mils (0.120 inch). In one embodiment, the liner has a thickness of 20 mils (0.020 inch).

The liner can be formed in any suitable manner, through use of one or more sheets of film or other material that may be sealed (e.g., welded) along edges thereof. In one embodiment, multiple flat sheets are superimposed (stacked) and sealed along edges thereof to form a liner. One or more sheets may include a port or cap structure along an upper portion of a face thereof. In another one embodiment, tubular blow molding is used with formation of an integral fill opening at an upper end of the vessel, which may be joined to a port or cap structure. The liner thus may have an opening for coupling of the liner to a suitable connector for fill or dispense operations involving respective introduction or discharge of fluid. Such opening may be reinforced with structure and termed a "fitment." A fitment typically includes a laterally extending flange portion to which thin film is joined, and a tubular portion extending in a direction substantially perpendicular to the flange portion. A liner fitment may mate with or otherwise contact a container port, container cap or closure, or other suitable structure. A cap or closure may also be arranged to couple with a diptube for introduction or dispensation of fluid.

In one embodiment, a rigid or substantially rigid collapsible liner is used. As used herein, the terms "rigid" or "substantially rigid," in addition to any standard dictionary definitions, are meant to also include the characteristic of an object or material to substantially hold its shape and/or volume when in an environment of a first pressure, but wherein the shape and/or volume may be altered in an environment of increased or decreased pressure. The amount of increased or decreased pressure needed to alter the shape and/or volume of the object or material may depend on the application desired for the material or object and may vary from application to application. In one embodiment, at least a portion of a rigid or substantially rigid collapsible liner is rigid, and at least a portion of the liner is subject to collapse under pressure dispensing conditions by application of a pressurized fluid to or against at least a portion of such a liner. In one embodiment, a rigid or substantially rigid collapsible liner may be fabricated of material of sufficient thickness and composition for the liner to be self-supporting when filled with liquid. A rigid or substantially rigid collapsible liner may be of single-wall or multi-wall character, and preferably comprises polymeric materials. Laminated composites of multiple layers of polymeric materials and/or other materials (e.g., laminated by application of heat and/or pressure) may be used. A rigid or substantially rigid collapsible liner may be formed by any one or more suitable lamination, extrusion, molding, shaping, and welding steps. A rigid or substantially rigid collapsible liner preferably has a substantially rigid opening or port integrally formed with the liner, thus avoiding the need for a separate fitment to be affixed to the liner by welding or other sealing methods. Dispensing assemblies and dispensing apparatuses as disclosed herein may be used with rigid or substantially rigid collapsible liners.

A liner may include two ports or fitments in a top portion thereof, although single port liners, or alternatively liners having more than two ports, can be usefully employed in the broad practice of the present invention. A collapsible liner may be disposed in a substantially rigid housing or overpack, which can be of a generally rectangular parallelepiped shape to promote stackabilty, with manual handling openings to enable the container to be manually grasped, and physically lifted or otherwise transported in use of the container. Alternatively, the overpack can be of a cylindrical form, or of any other suitable shape or conformation. A generally rigid housing may also include overpack lid that is leak-tightly joined to walls of the housing, to bound an interior space containing the liner. An interstitial space provided between the liner and overpack container may be in fluid communication with a pressurized gas source, such that addition of pressurized gas to the interstitial space compresses the liner to cause liquid to be expelled from the liner.

A pressure dispense package as disclosed herein may be coupled to a process tool in a microelectronic product manufacturing facility. Such a tool may, for example, comprise a spin coater for applying photoresist to a wafer, with the dispensed liquid constituting a suitable photoresist material. The tool alternatively can be of any suitable type adapted for utilizing a specified chemical reagent dispensed from the pressure dispense container. Liquid chemical reagents can therefore be dispensed for use in the microelectronic product manufacturing facility from one or more liner-based packages to yield a microelectronic product e.g., a flat panel display or a semiconductor wafer incorporating integrated circuitry.

A liner advantageously is formed of a film material of appropriate thickness to be flexible and collapsible in character. In one embodiment, the liner is compressible such that its interior volume may be reduced to about 10% or less of the rated fill volume, i.e., the volume of liquid able to be contained in the liner when same is fully filled in the housing 14. In various embodiments, the interior volume of a liner may be compressible to about 0.25% or less of rated fill volume, e.g., less than 10 milliliters in a 4000 milliliter package, or about 0.05% or less (10 mL or less remaining in a 19 L package), or 0.005% or less (10 mL or less remaining in a 200 L package). Preferred liner materials are sufficiently pliable to allow for folding or compressing of the liner during shipment as a replacement unit. The liner preferably is of a composition and character that is resistant to particle and microbubble formation when liquid is contained in the liner, that is sufficient flexible to allow the liquid to expand and contract due to temperature and pressure changes and that is effective to maintain purity for the specific end use application in which the liquid is to be employed, e.g., in semiconductor manufacturing or other high purity-critical liquid supply application.

For semiconductor manufacturing applications, the liquid contained in the liner of a pressure dispensing container as disclosed herein should have less than 75 particles/milliliter (more preferably less than 50, still more preferably less than 35, and more preferably less than 20 particles/milliliter), of particles having a diameter of 0.20 microns or larger, at the point of fill of the liner, and the liner should have less than 30 (more preferably less than 15) parts per billion total organic carbon (TOC) in the liquid, with less than 10 parts per trillion metal extractable levels per critical elements, such as calcium, cobalt, copper, chromium, iron, molybdenum, manganese, sodium, nickel, and tungsten, and with less than 150 parts per trillion iron and copper extractable levels per element for liner containment of hydrogen fluoride, hydrogen peroxide and ammonium hydroxide, consistent with the specifications set out in the Semiconductor Industry Association, International Technology Roadmap for Semiconductors (SIA, ITRS) 1999 Edition.

One aspect of the invention contemplates headspace removal from the container so that the container has a zero or near-zero headspace. A connector of appropriate type is employed for coupling with the container to enable dispensing operation to be conducted. The flow circuitry coupled with the connector can be of any suitable type, including for example, solenoid valves, or high purity liquid manifold valves, as well as pressure regulators, e.g., of a current to pressure controlled type.

The foregoing system allows the headspace gas to be dispensed to a reservoir that is "on-line" (active in the dispensing flow circuitry) and dispensing to a downstream process tool, or other locus of use. The headspace gas can also be dumped to a drain or other disposition could be made of such gas. Each of the multiple containers can be arranged with a dedicated reservoir, so as to allow headspace gas removal, separate from the system.

The above-described system can be coupled to existing equipment to implement full control over chemical dispense by the downstream tool or other dispensed material-utilizing apparatus or process. The system can be arranged to supply dispensed material to the inlet valves of a reservoir, and be in a ready state when material is requested by the downstream process equipment. This minimizes any changeover period while maximizing chemical utilization.

Headspace removal can utilize a sensor that detects liquid media in a tube or in a reservoir. Components of the system described above can be used for stand-alone or retrofit systems, based on existing installation and facility requirements.

Figure 2:
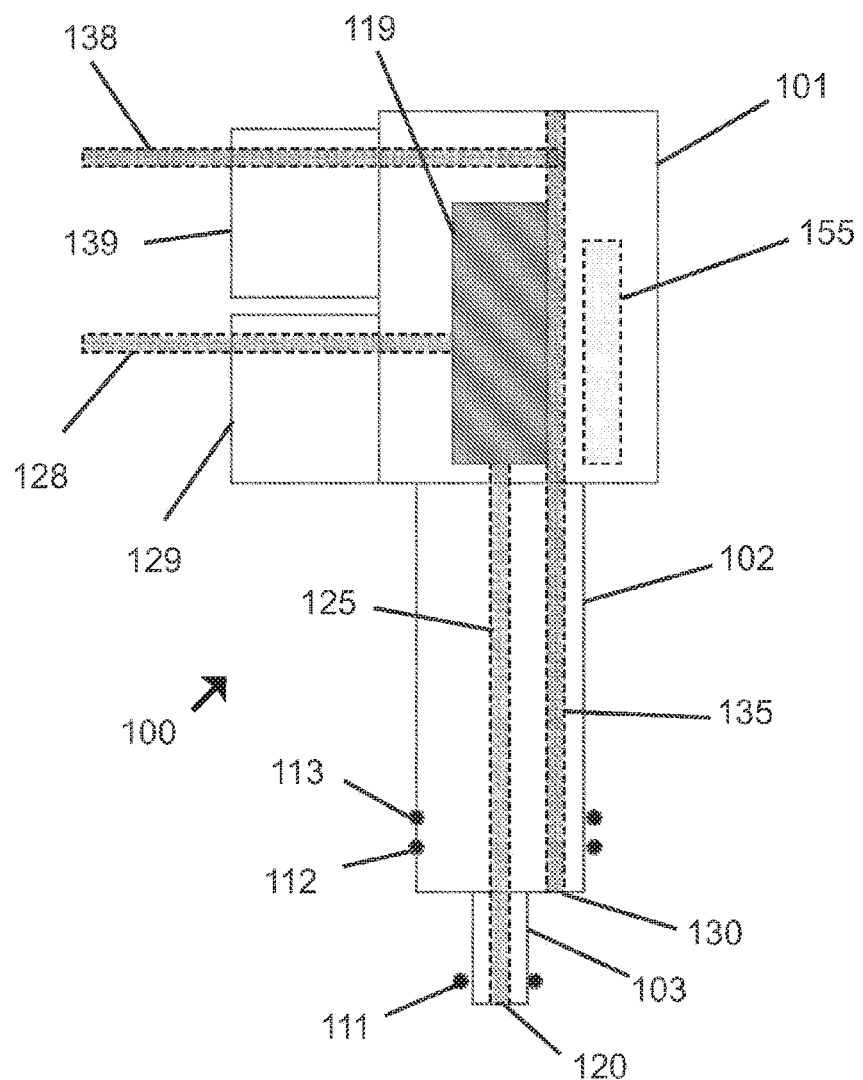
FIG. 2 is a simplified schematic cross-sectional view of a connector for a pressure dispense package according to one embodiment of the present invention, the connector including a gas extraction conduit and a liquid extraction conduit independent of the gas extraction conduit.

Referring to FIG. 2, in one embodiment a connector 100 for use with a pressure dispense apparatus includes a gas extraction conduit 135 and a liquid extraction conduit 125 that are independent and distinct from one another. The connector 100 includes an upper body structure 101 to which a gas vent valve 139 and a liquid dispensing valve 129 are fixed, to regulate flow through a gas outlet port 138 and a liquid outlet port 128, respectively. The upper body structure 101 includes a pressure transducer 119 in sensory communication with the liquid extraction conduit 125. One or more additional sensor(s) 155 may also be associated with the upper body structure 101 in sensory communication with either or both of the gas extraction conduit 135 and the liquid extraction conduit 125. Examples of types of sensors that may be employed as the sensor(s) 155 include level sensors, capacitive sensors, optical sensors, chemical-specific presence and/or concentration sensors, pressure sensors, particle counters, temperature sensing elements, and flow metering elements, which may be operatively coupled to one or more signal processing elements. Disposed below the upper body structure 101 is an intermediate body structure 102 through which the gas extraction conduit 135 and the liquid extraction conduit 125 are defined. The intermediate body structure 102 may be cylindrical in shape and have associated circumferential sealing elements 112, 113, which may be in the form of O-rings, for mating with a corresponding bore or portion of a dispensing assembly (described hereinafter). A lower opening 130 of the gas extraction conduit 135 is arranged along a lower surface of the intermediate body structure 102. A lower body structure 103 (such as may be suitable for mating with a liner fitment adapter or diptube coupler, described hereinafter) may have an additional circumferential sealing element 111, and may extend further downward to define a lower end 120.

The lower end 120 may be arranged for mating with a diptube (not shown) inserted link to the interior of a pressure dispense container for extraction of liquid therefrom. The intermediate body structure 102 and lower body structure 103 in combination may be termed a probe.

By providing a gas extraction conduit 135 and a liquid extraction conduit 125 that are independent and distinct within a unitary connector 100, and eliminating presence of a reservoir, the connector illustrated in FIG. 2 differs from the connector including a reservoir and a common gas/liquid conduit as disclosed in International Patent Application Publication No. WO/2007/146892 ("the '892 publication") mentioned hereinabove. The connector 100 shown in the accompanying FIG. 2 replies upon primary separation of bubbles (gas) and liquid within the pressure dispense package to which the connector 100 is affixed, rather than gas/liquid phase separation within an in-connector reservoir.

If a liquid extraction opening (e.g., at the end of a diptube) exposed to the interior volume of a pressure dispense container is arranged below a gas extraction opening exposed to the same interior volume, then gas may be extracted from the interior volume (i.e., via the gas extraction conduit 135 and gas outlet port 138) before and/or during extraction of liquid from the interior volume (via the liquid extraction conduit 125 and liquid outlet port 128). A gas extraction opening exposed to the interior of a pressure dispense container is preferably disposed at a level above a liquid extraction opening exposed to the interior of the container. Presence of independent extraction openings for liquid and gas permits continued flow of liquid through a connector of a liner-based pressure dispense assembly even if the liner should rupture, if the diptube extends to the bottom of a liner (or suitable container). Additionally, relative to the diptube disclosed in the '892 publication (which included two ports with one at the top portion above the diptube and another at the bottom of the diptube), a diptube as disclosed herein eliminates the port at the top of the diptube so that even if a liner should leak, only liquid (without pressurization gas) air can be withdrawn by the diptube. Moreover, elimination of an in-connector reservoir (i.e., as disclosed in the '892 publication) significantly reduces the overall size of the connector 100, and also avoids any limitation associated with dispensing liquids of high viscosities and/or at high flow rates, in which gravimetric phase separation in the small confines of an in-connector reservoir may be too slow to prevent carryover of gas bubbles in a liquid outlet stream.

Figure 3:
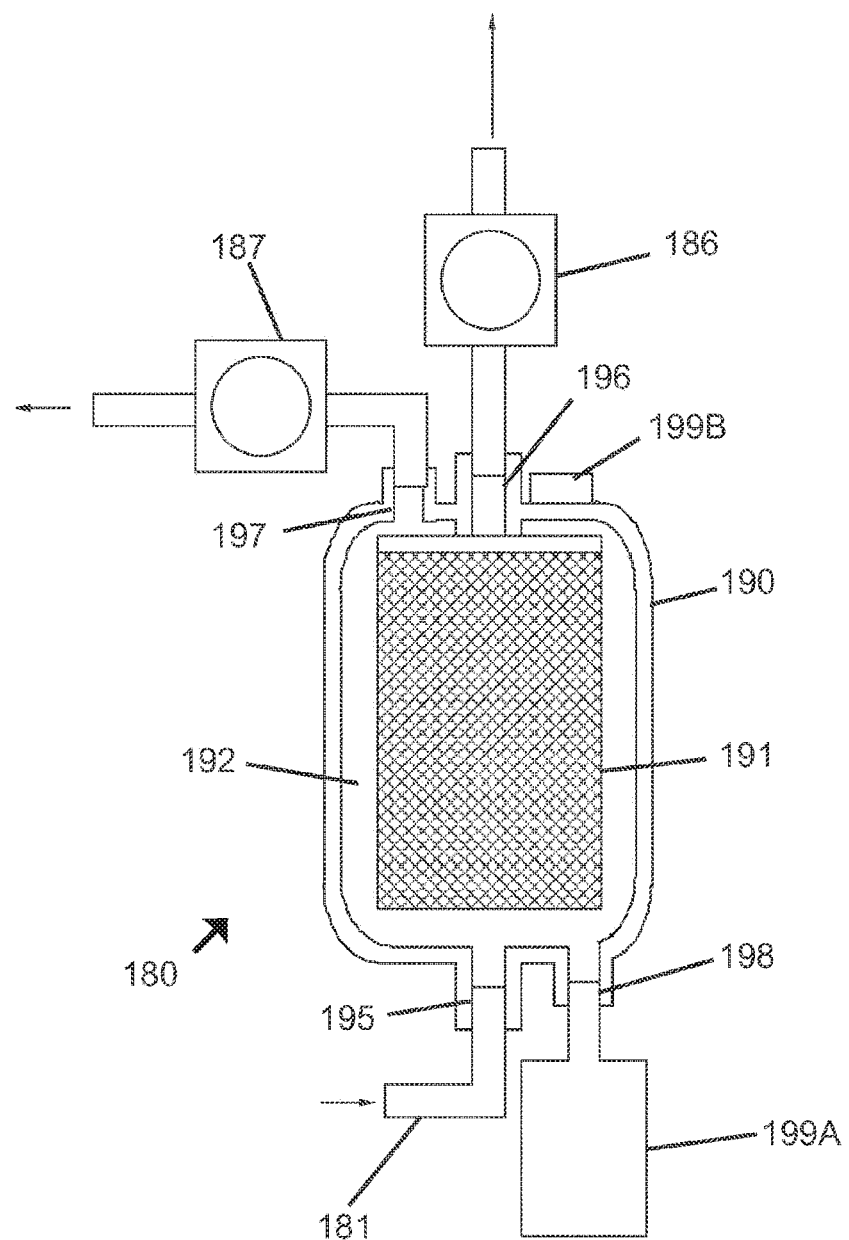
FIG. 3 is a schematic cross-sectional view of a reservoir body arranged for placement downstream of a dispense package or dispensing assembly and including therein a filtration medium adapted to permit passage of liquid but prevent passage of bubbles, with a pressure transducer in sensory communication with the interior volume, according to one embodiment of the present invention.

Referring to FIG. 3, in one embodiment a liquid delivery system for use with a pressure dispense container may include a reservoir-based gas separation device 180 that is distinct from and disposed downstream of a connector (such as the connector 100 illustrated in FIG. 2) for use with the pressure dispense container. The separation device 180 includes a reservoir body 190 defining a liquid inlet port 195, a liquid outlet port 196, a gas outlet port 197, and a sensor port 198. Reservoir bodies of various types and including various filtration media consistent in character to the device 180 (but lacking any pressure transducer) are commercially available from Mykrolis Corporation (Billerica, Mass., USA). In FIG. 3, each of the liquid outlet port 196 and the gas outlet port 197 may have an associated flow control element (e.g., valve) 186, 187 to control or regulate flow through the respective port 196, 197. The reservoir body 190 defines an interior volume containing a filtration medium 191 adapted to permit passage of liquid but prevent passage of bubbles. The filtration medium 191 may include, for example, any one or more of a mesh, packed or porous media, a membrane, and a spunbonded material (e.g., spunbonded polyolefin). Multiple types of filtration media may be used for different or complementary purposes, and may be disposed in series. For example, a first filtration media type and/or porosity may be used to capture particulate material, a second filtration media type and/or porosity may be used to prevent passage of gas bubbles of a specified first (e.g., larger) size, and third filtration media type and/or porosity may be used to prevent passage of gas bubbles of a specified second (e.g., smaller) size. Selection of appropriate filtration media may be dependent upon properties of the fluid to be dispensed and operating conditions thereof; such selection is known to one skilled in the art. Multiple filter bodies each having different filtration media from one another may be disposed in series. Each filter is preferably removable and replaceable, such as with a dedicated fitting or housing adapted to receive a replacement filter element.

In operation, fluid is supplied to the reservoir-based gas separation device 180 through a liquid supply line. Such fluid may include liquid having entrained bubbles and/or particles. The fluid enters the interior 192 of the reservoir body 190. In one embodiment, liquid is permitted to pass through the filtration medium 191, but gas bubbles within the fluid is not. Gas bubbles may accumulate along the exterior of the filtration medium 191, and then flow toward the gas outlet port 197 to exit the device 180. The gas control element 187 may be closed for extended periods while the liquid control element 186 remains open, to prevent the liquid from escaping through the gas control element 187. The gas control element 187 may be periodically opened to "burp" or otherwise vent gas that is accumulated within the reservoir interior 192, either while the liquid control element 186 remains open, or when the liquid control element 186 is closed.

A pressure transducer 199A is in sensory communication with the interior volume 192 through the sensor port 198 and is arranged to generate an output signal indicative of pressure within such interior volume 192. An associated controller (not shown) may be arranged and used to control flow of fluid (e.g., the fluid stream supplied to the reservoir body 190, a liquid stream exiting the reservoir body, and/or a gas stream exiting the reservoir body) responsive to the output signal. In one embodiment, the pressure transducer 199A may be used to sense pressure droop of the dispense fluid as indicative of a condition of exhaustion or near exhaustion of fluid within the pressure dispense package. In one embodiment, the pressure transducer 199A may be used to send an elevated back pressure condition within the reservoir body 190, as indicative of potential clogging of the filtration medium 191 and/or accumulation of excess gas within the interior volume 192, so as to trigger appropriate alarms and/or remedial action. A level sensor 199B (e.g., capacitive) is also provided with the reservoir-based gas separation device 180, and may be used to sense liquid level within the interior 192 of the reservoir body 190. Operation of a pressure dispense container disposed upstream of the reservoir-based gas separation device 180, and/or operation of the reservoir-based gas separation device 180 itself, may be controlled responsive to an output signal of the pressure transducer 199A and/or an output signal of the level sensor 199B. If liquid level within the interior 192 of the reservoir body 192 drops too low, as detected by the level sensor 199B, then such condition may be used to trigger venting of gas from the interior 192 using the gas control element 187 to provide automatic gas venting utility.

In one embodiment, either of the pressure transducer 199A and/or level sensor 199B may be substituted or supplemented with at least one other sensor. Examples of types of sensors that may be employed as the sensor(s) 199A or 199B include optical sensors, chemical-specific presence and/or concentration sensors, particle counters, flow metering elements (e.g., a coriolis-type sensor), and temperature sensors. A flow metering element may be embodied in a mass flow controller. Such other sensor(s) may be connected to the reservoir body 190 via an available port 198, or may be disposed in a flow-through relationship, such as in-line with the fluid inlet port 195, the liquid outlet port 186, and/or the gas outlet port 187. Signals from the one or more other sensor(s) may also be used to control operation of a pressure dispense container disposed upstream of the reservoir-based gas separation device 180, and/or operation of the reservoir-based gas separation device 180 itself.

Figure 4A:
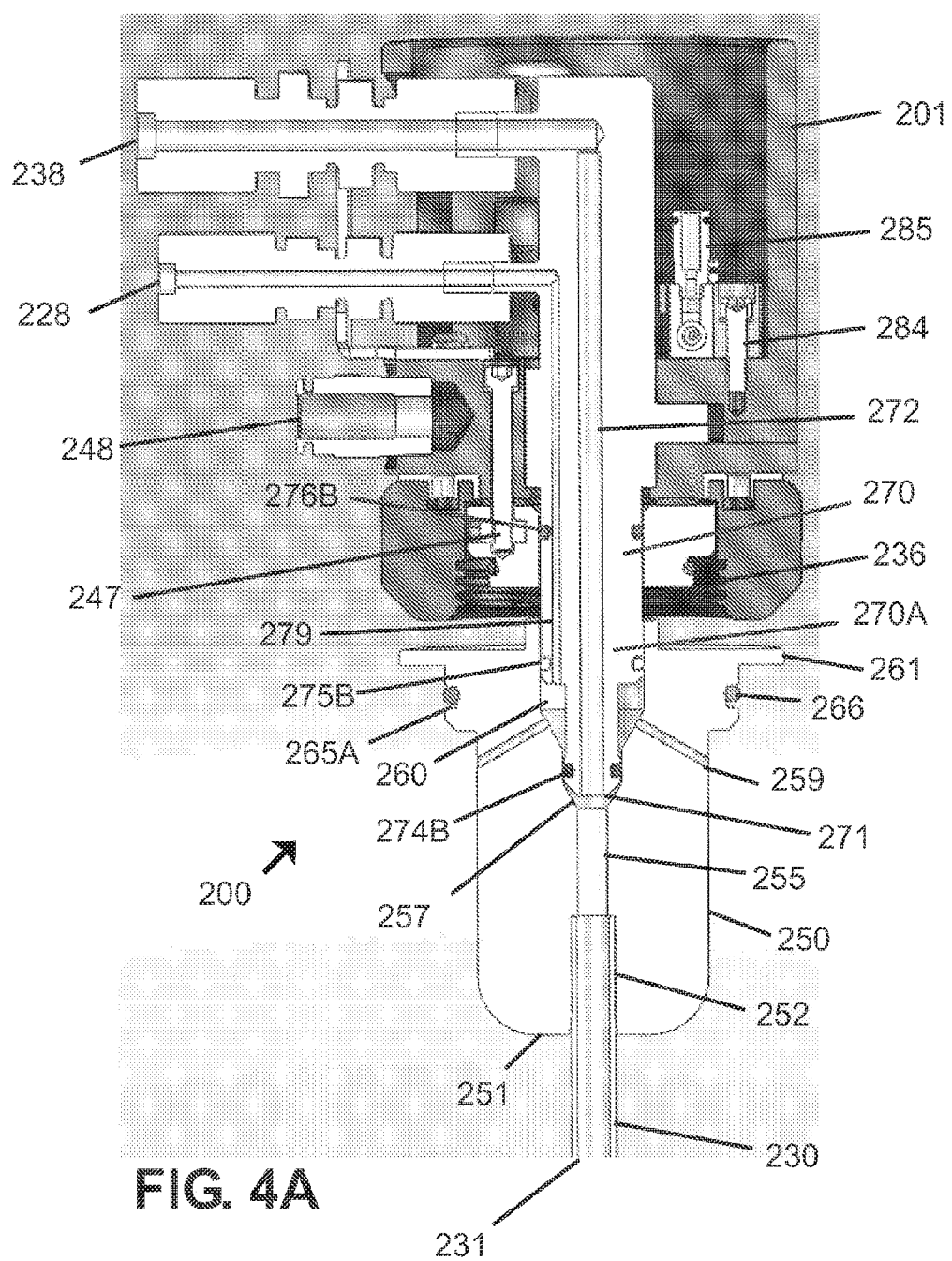
FIG. 4A is a side cross-sectional view of a connector, liner fitment adapter, and diptube adapted for use with a pressure dispense package according to one embodiment of the present invention.
Figure 4B:
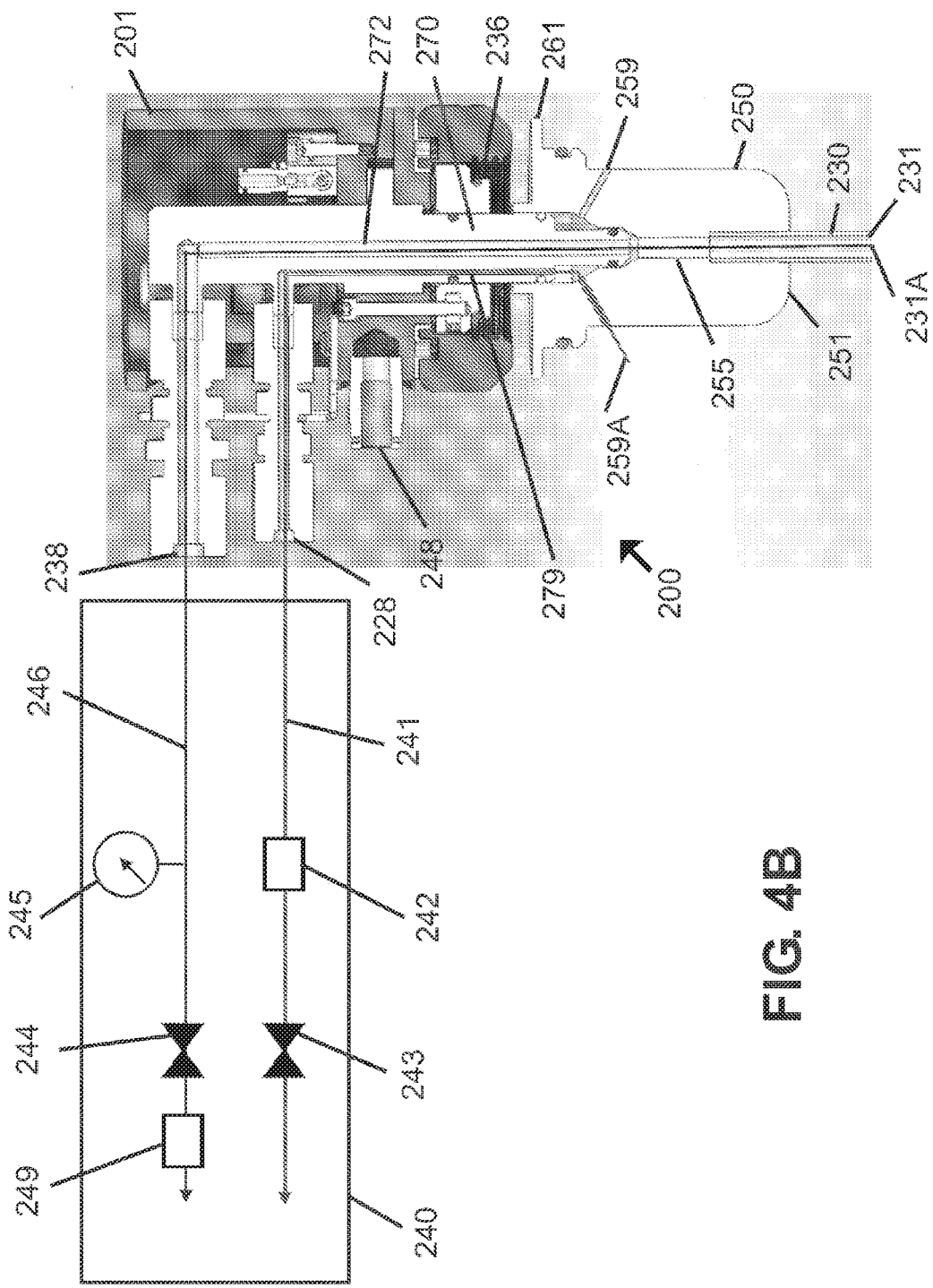
FIG. 4B includes the side cross-sectional view of the connector, liner fitment adapter and diptube of FIG. 4A, and a simplified schematic view of downstream sensing and flow control components, according to one embodiment of the present invention.
Figure 6A:
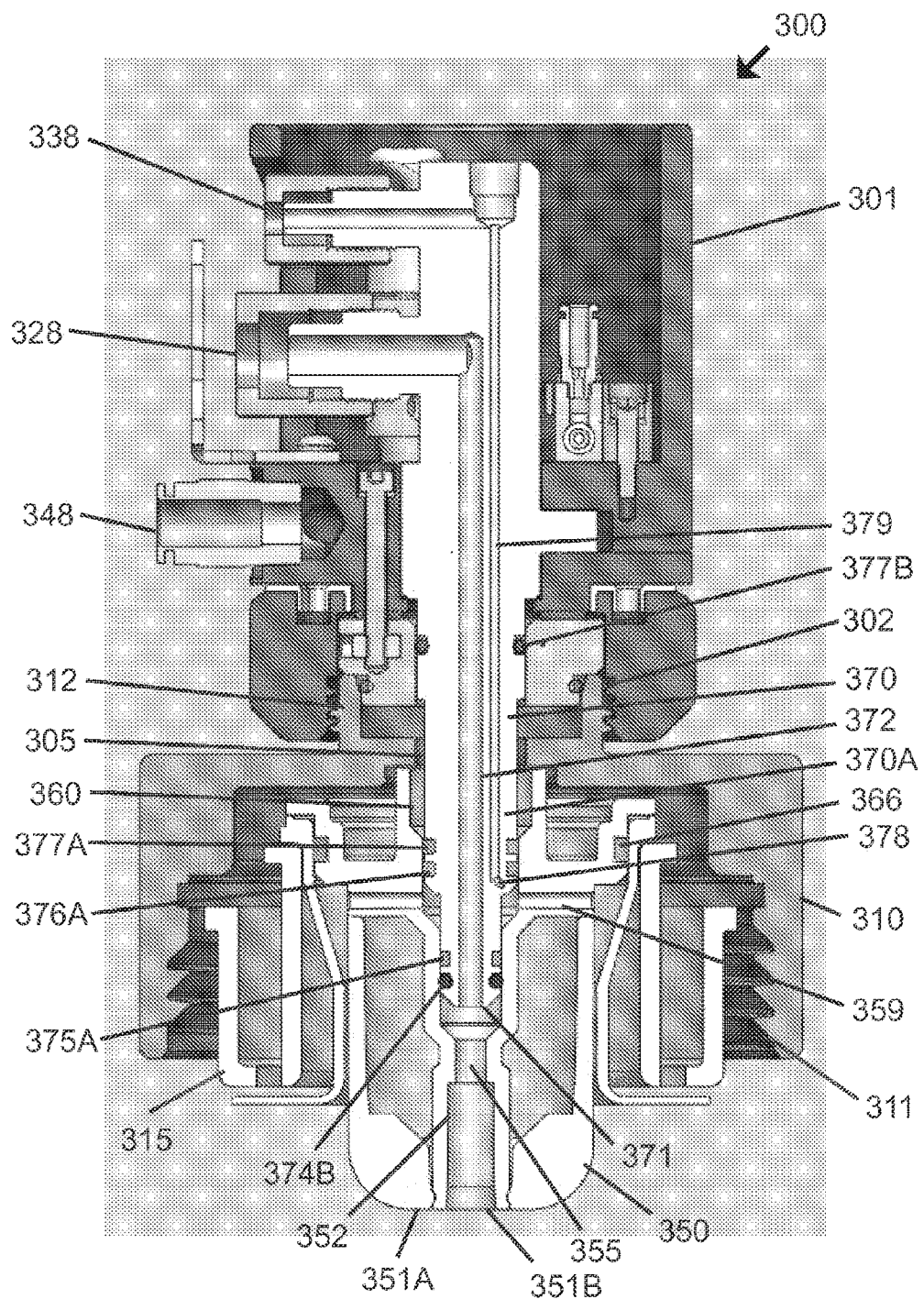
FIG. 6A is a side cross-sectional view of a connector, closure, liner fitment, and liner fitment adapter arranged for use with a pressure dispense package, according to one embodiment of the present invention.
Figure 7A:
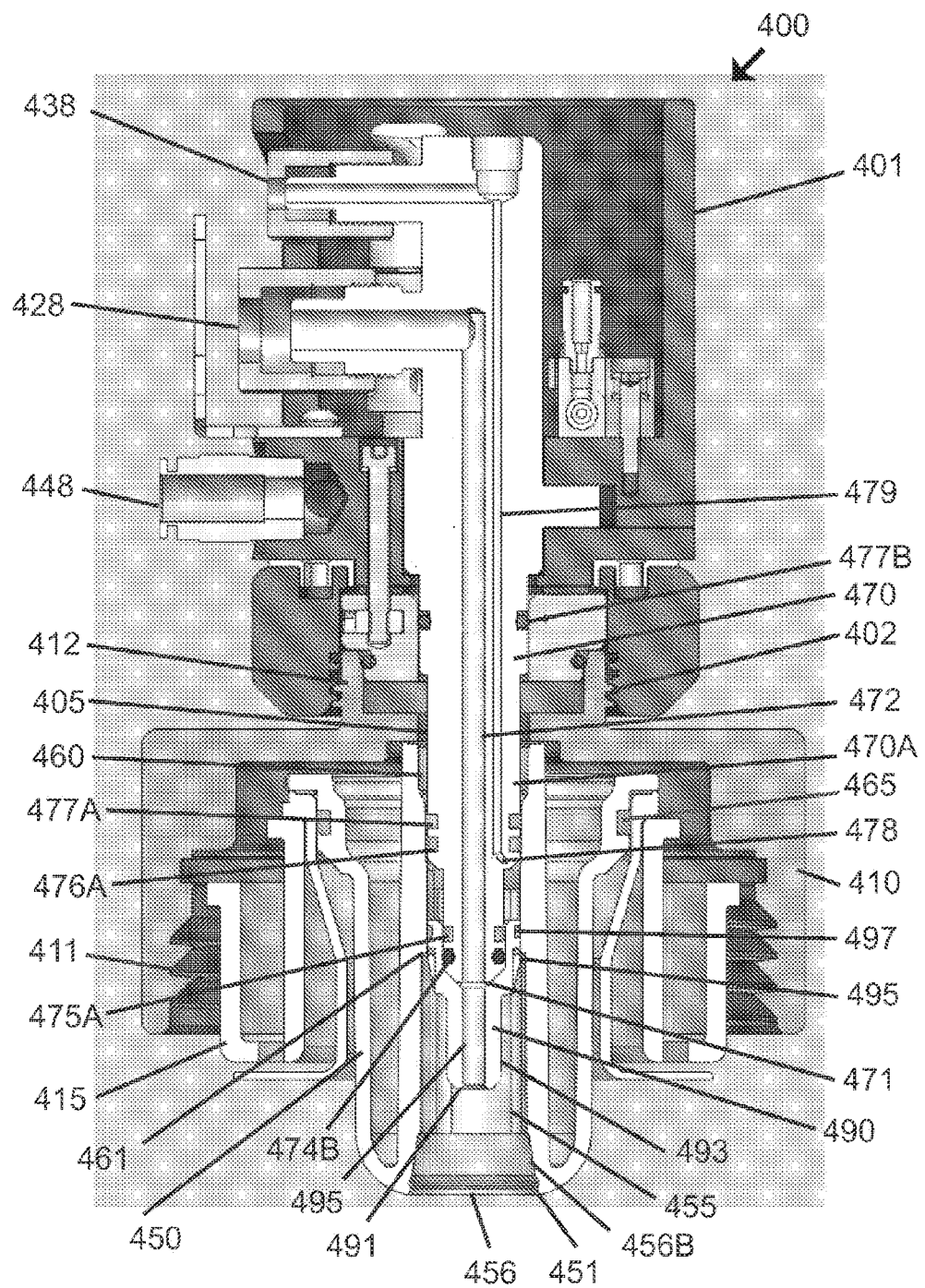
FIG. 7A is a side cross-sectional view of a connector, closure, liner fitment, and liner fitment adapter arranged for use with a pressure dispense package, according to one embodiment of the present invention.

FIGS. 4A-4B illustrate a specific arrangement of a dispensing assembly 200 including a connector 270, a liner fitment adapter 250, and diptube 230 for a pressure dispense package according to one embodiment, with FIG. 4B further including schematic illustrations of downstream flow control components. The liner fitment adapter 250 is arranged for intermediate connection between the connector 270 and a liner fitment (such as shown in FIGS. 6A and 7A). Referring to FIG. 4A, the connector 270 includes a body structure 201, a downwardly extending probe portion 270A, a liquid outlet port 238 in fluid communication with a liquid extraction conduit 272, a gas outlet port 228 in fluid communication with a gas extraction conduit 279, and a pressurization gas inlet arranged to supply gas to a pressurization gas conduit. The liquid extraction conduit 272 terminates at a lower end 271 of the connector 270. The connector 270 may include an optional pressure sensor arranged to sense pressure of gas supplied to the interstitial volume between the liner and the container. Circumferential sealing elements 274B, 275B, 276B may be provided along lower portions of the connector 270 to promote sealing engagement of the connector 270 with an upper portion 260 of a longitudinal bore defined in the liner fitment adapter 250. The term "longitudinal" as used in this context refers to a direction generally along or near a vertical axis when the fitment adapter is placed upright. When the connector 270 is inserted into an upper portion 260 of the longitudinal bore of the liner fitment adapter, sealing elements 275B, 274B of connector 270 are disposed above and below, respectively, at least one lateral gas passage 259 defined through the liner fitment adapter 250, and the liquid extraction conduit 272 of the connector 270 is aligned with a central portion 255 and a lower portion 252 of the longitudinal bore to enable fluid communication with the diptube 230. The term "lateral" as used in this context refers to a direction having a radial component departing from a substantially longitudinal direction. For example, the lateral gas passage 259 may be orthogonal to a longitudinal axis through the liner fitment adapter 250, or it may be angled to include change in both horizontal and vertical components. The diptube 230 is insertable into the lower portion 252 of the longitudinal bore along a lower edge 251 of the liner fitment adapter 250. The lateral gas passage 259, which includes an opening exposed to the interior volume of a liner of a pressure dispense package, is in fluid communication with the gas extraction conduit 279. A laterally protruding edge 261 is provided along an upper portion of the liner fitment adapter 250. Below the laterally protruding edge 261, a circumferential sealing element 266 (e.g., an O-ring) is disposed in a groove 265A to promote sealing between the fitment adapter 250 and a liner fitment or other component (not shown).

FIG. 4B shows the same dispensing assembly 200 as shown in FIG. 4A, but with addition of a downstream flow control and sensing assembly 240 including a liquid outlet line 246 having an associated pressure transducer 245, a liquid flow control element 244, and a bubble sensor 249 arranged to generate an output signal indicative of presence of bubbles in liquid dispensed from the pressure dispense package. The flow control and sensing assembly 240 also includes a gas outlet line 241 having a bubble sensor and/or liquid sensor 242 and a gas flow control element 243. The flow control and sensing assembly 240 may include a controller (not shown) to receive inputs from any of various sensors disposed in the assembly 240, associated with the dispensing assembly 200, and/or associated with a process disposed further downstream of the flow control and sensing assembly 240. The pressure transducer 245 may be utilized to sense pressure droop of the dispense fluid as indicative of a condition of exhaustion or near exhaustion of fluid within the pressure dispense package, with an output signal of the pressure transducer 245 being useable to effect automatic switchover of dispensing from one pressure dispense container to another, to actuate an alarm condition, or take any other appropriate action. The bubble sensor 249 arranged in the liquid outlet line 246 may be used to detect whether bubbles are being dispensed in the liquid line, and if so, to stop dispensing. The bubble sensor and/or liquid sensor 242 arranged in the gas outlet line 241 may be used to sense a condition indicate of liquid presence in the gas outlet line 241, and if so, to stop passage of fluid through the gas outlet line 241. The foregoing sensors may be substituted or supplemented with one or more sensors of various types as disclosed herein, such as (but not limited to) level sensors, capacitive sensors, optical sensors, chemical-specific presence and/or concentration sensors, pressure sensors, particle counters, and flow metering elements. Headspace gas may be vented through the gas outlet line 241 just before or at the beginning of pressure dispensation of liquid from a pressure dispense container, with the gas flow control element 243 (e.g., a valve) being operable to selectively trigger such venting. Flow through the gas outlet line may be blocked during liquid dispensing operation while liquid is flowing through the liquid outlet line 246.

Figure 5A:
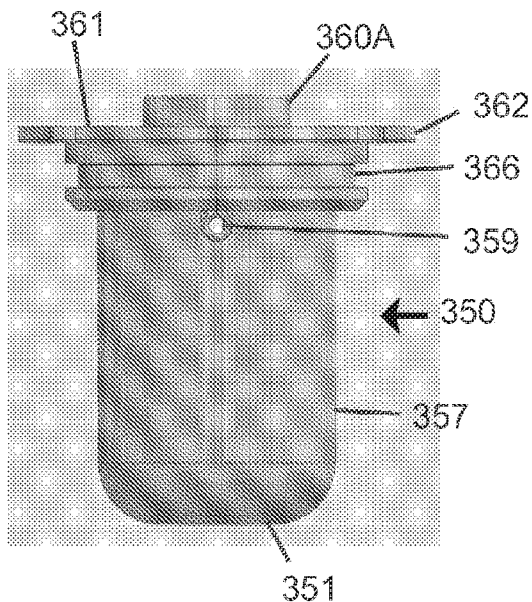
FIG. 5A is a side elevation view of a liner fitment adapter adapted for use with a pressure dispense package, according to one embodiment of the present invention.
Figure 5B:
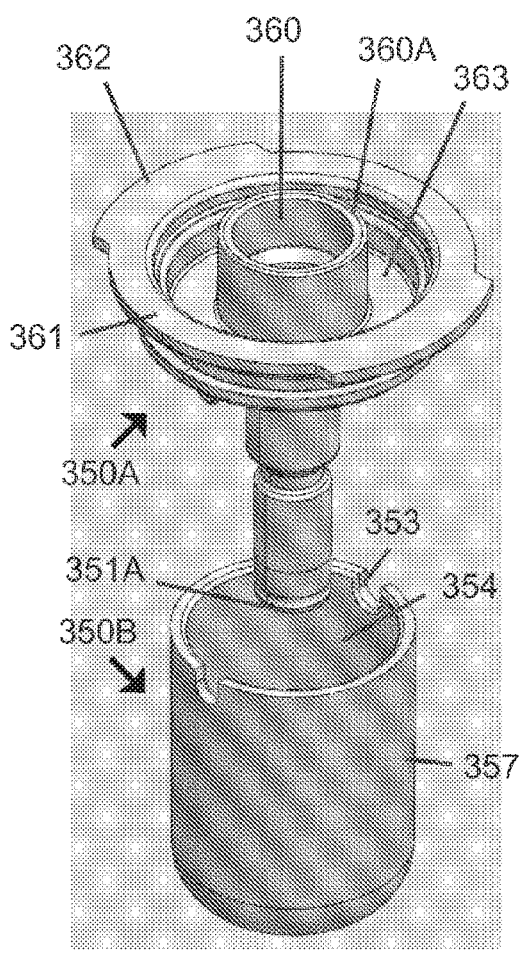
FIG. 5B is a perspective assembly view of the liner fitment adapter of FIG. 5A.
Figure 5C:
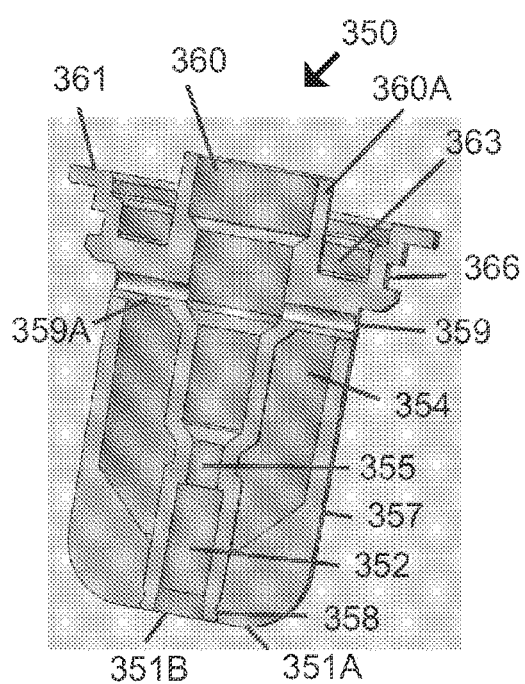
FIG. 5C is a cross-sectional view of the liner fitment adapter of FIGS. 5A-5B.

FIGS. 5A-5C illustrate a liner fitment adapter 350 similar in character to the liner fitment adapter 250 illustrated in FIGS. 4A-4B. The male inner portion 350A of the fitment adapter 350 includes an upper surface 361 having a flared edge 362, with an annular recess 363 extending below the upper surface 361. Below the flared edge 362, a circumferential groove 366 is provided to receive a sealing element such as an O-ring (not shown) to promote sealing between the fitment adapter 350 and a liner fitment or other component (not shown).

As shown in FIG. 5B, the fitment adapter 350 may be fabricated in two parts, including a cup-like female outer portion 350B having a wall 357, and a male inner portion 350A arranged for insertion into the outer portion 350B. The female outer portion 350B defines a cavity 354 and notches 353 that are arranged to receive lateral tubes 359A defining lateral gas passages 359 of the male inner portion 350A. The female outer portion 350B has a lower end 351B defining a bore 358 arranged to receive a protruding lower end 351A of the male inner portion 350A, with detent and recess elements defined in the portions 350A, 350B for retention of such portions. The male inner portion 350A defines a longitudinal bore including an upper portion 360 (defined in part by an upwardly protruding tubular segment 360A), and intermediate bore portion 355, and a lower bore portion 352 that extends to a lower edge 351B of the male portion 350A of the fitment adapter 350. The bore portions 360, 355, 352 are preferably coaxial but may have different diameters relative to one another; as shown. The intermediate portion 355 may have a small diameter than each of the upper portion 360 and the lower portion 352 to serve as a travel stop so as to prevent insertion of either a connector or dip tube too far into the liner fitment adapter 350. The lower bore portion 352 may optionally define at least one helical compression feature (not shown) arranged to compressively retain a diptube (not shown) inserted into the lower portion 352 of the longitudinal bore. The upper bore portion 360 is arranged to receive a portion of a connector (such as the connector 270 shown in FIGS. 4A-4B). The lateral gas passage 359 as illustrated in FIG. 5C is substantially orthogonal (perpendicular) to the upper portion 360 of the longitudinal bore. In operation of a dispensing assembly including the liner fitment adapter 350, the lateral gas passage 359 is preferably in fluid communication with a gas extraction conduit when a connector is inserted into the upper bore portion 360.

FIG. 6A illustrates a dispensing apparatus 300 including a connector 370, a closure 310, a liner fitment retainer 315, and a liner fitment adapter 350, arranged for use with a pressure dispense package. A liner fitment (not shown) would be disposed between the fitment retainer 315 and liner fitment adapter 350. The connector 370 includes a body structure 301, a downwardly extending probe portion 370A, a liquid outlet port 328 in fluid communication with a liquid extraction conduit 372, a gas outlet port 338 in fluid communication with a gas extraction conduit 379, and a pressurization gas inlet 348 in fluid communication with a pressurization gas conduit 347. The liquid extraction conduit 372 terminates at a lower end 371 of the connector 370. The connector 370 may include an optional pressure sensor, which may be arranged to sense pressure in the interstitial space between the liner and the overpack container. Various circumferential grooves (e.g., grooves 375A, 376A, 377A) arranged to retain circumferential sealing elements (e.g., sealing elements 374B, 377B) such a O-rings may be provided along portions of the connector 370 to promote sealing engagement of the connector 370 with an upper portion 360 of a longitudinal bore defined in the liner fitment adapter 350. When the connector 370 is inserted into an upper portion 360 of the longitudinal bore of the liner fitment adapter 350, sealing elements (e.g., as installed in grooves 375A, 376A) of the connector 370 are disposed above and below, respectively, a lateral gas passage 359 defined through the liner fitment adapter 350, and the liquid extraction conduit 372 of the connector 370 is aligned with a central portion 355 and a lower portion 352 of the longitudinal bore to enable fluid communication with a diptube (such as diptube 330 illustrated in FIG. 6B) insertable into the lower portion 352 of the longitudinal bore along the lower edge 351 of the liner fitment adapter 350. The lateral gas passage 359 as illustrated in FIG. 6A is substantially orthogonal (perpendicular) to the upper portion 360 of the longitudinal bore defined in the liner fitment adapter 350, and the lateral gas passage 359 being in fluid communication with the gas extraction conduit 379 (by way of a lateral segment 378 defined in the connector 372) when the connector 370 is inserted into the fitment adapter 350. A laterally protruding edge is provided along an upper portion of the liner fitment adapter 350. Below the laterally protruding edge 361, a circumferential groove 366 is provided to receive a circumferential sealing element (e.g., an O-ring) to promote sealing between the fitment adapter 350 and the liner fitment retainer 315 or other associated components.

Arranged for placement adjacent to the liner fitment adapter 350 is a liner fitment (not shown) adapted to be joined to a collapsible liner (not shown). Disposed above the liner fitment retainer 315 and liner fitment adapter 350 is a closure 310 for a pressure dispensing vessel such as an overpack container (not shown), with the closure 310 including a female threaded surface 311 arranged for mating with a corresponding male threaded neck (not shown) of a pressure dispensing vessel. The closure 310 has an associated male threaded neck 312 that extends upward to receive a threaded socket 302 along a lower portion of a connector body 301 A breakseal 305 is disposed within or adjacent to the threaded neck 312, and preferably includes a rupturable membrane that maintains sealing conditions within a pressure dispense package until the connector 370 is inserted through the breakseal 305 to mate with the liner fitment adapter 350. When the connector 370 is inserted into the liner fitment adapter 350, fluidic connections are simultaneously made between (a) the gas extraction conduit 379 and the interior volume of a liner (not shown) mounted to the liner fitment, (b) the liquid extraction conduit 372 and the interior volume of the liner, and (c) the pressurization gas conduit (not shown) and an interstitial space between an overpack container (not shown) and the liner. Establishment of simultaneous connections with a single connector insertion step promotes user convenience and eliminates possibility of faulty connection, and presence of a single opening in a liner minimizes potential leakage paths.

A diptube 330 suitable for use with the dispensing assembly 300 is shown in FIG. 6B. The diptube, which includes a central bore arranged to conduct fluid, includes a straight upper end 332 and a lower end 331 including a lateral opening 333 and a bottom bore opening (not shown). Presence of both a lateral bore opening 333 and a bottom bore opening reduces likelihood that liquid flow from a liner to the diptube 330 will be occluded (i.e., both vertically and laterally) by collapse of such a liner during pressure dispensing operation. The diptube 330 have a straight upper end 332 is arranged to be press-fit into the lower portion 352 of the longitudinal bore of the liner fitment adapter 350 (shown in FIG. 6A). Since the intermediate portion 352 of the longitudinal bore of the liner fitment adapter 350 has a smaller diameter than the diptube 330, the diptube 330 should be fitted into the lower portion 352 of the longitudinal bore of the liner fitment adapter 350 before the liner fitment adapter 350 is inserted into a pressure dispense container, and before the connector 370 is inserted into upper portion 360 of the longitudinal bore of the liner fitment adapter 350.

FIG. 7A shows a dispensing apparatus 400 that is similar in many respects to the dispensing apparatus of FIG. 6A, but with a different liner fitment adapter 450 that is arranged for use with a different diptube (i.e., the diptube 430 illustrated in FIG. 7B). The dispensing apparatus 400 including a connector 470, a closure 410, a liner fitment retainer 415, and a liner fitment adapter 451, arranged for use with a pressure dispense package. The connector 470 includes a body structure 401, a downwardly extending probe portion 470A, a liquid outlet port 428 in fluid communication with a liquid extraction conduit 472, a gas outlet port 438 in fluid communication with a gas extraction conduit 479, and a pressurization gas inlet 448 in fluid communication with a pressurization gas conduit (not shown). The liquid extraction conduit 472 terminates at a lower end 471 of the connector 470. The connector 470 may include an optional pressure sensor, which may have an associated pressure sensing line in fluid communication with the interstitial space between the liner and the overpack container. Various circumferential grooves (e.g., grooves 475A, 476A, 477A) arranged to retain circumferential sealing elements (e.g., sealing elements 474B, 477B) such a O-ring s may be provided along portions of the connector 470 to promote sealing engagement of the connector 470 with an upper portion 460 of a longitudinal bore 460 in the liner fitment adapter 450. When the connector 470 is inserted into the upper portion 460 of the longitudinal bore, sealing elements (e.g., as installed in grooves 475A, 476A) of the connector 470 are disposed above and below, respectively, a lateral gas passage (not shown) defined through the liner fitment adapter 450 to extend into the longitudinal bore, and in fluid communication with a lateral segment 478 and gas extraction conduit 479 defined in the connector 470. Grooves 476A, 477A may include sealing elements (not shown) arranged to engage the upper portion 460 of the longitudinal bore of the liner fitment adapter 450.

When the connector 470 is inserted into the liner fitment adapter 450, the lower end 471 of the connector 470 (i.e., opening into liquid extraction conduit 472) engages a coupler 490 disposed within the longitudinal bore, with a first sealing element 474B and an additional sealing element (not shown) disposed in a circumferential groove 475A in the coupler 490 being arranged to engage an upper recess of the coupler 490. The coupler 490 includes a body 471 with a flared exterior portion 495 arranged to abut a shoulder 461 of the longitudinal bore 460. Ribs 497 arranged along an exterior surface 493 of the coupler 490 are provided to support and locate the fitment adapter 450. Gaps (not shown) allow passage of gas past the ribs 497. The coupler 490 also defines a liquid conduit 495 in fluid communication with the liquid extraction conduit 472 to enable fluid communication with a diptube (such as diptube 430 illustrated in FIG. 7B) insertable into a lower portion of the longitudinal bore 460 to mate with a lower end 491 of the coupler 490. An outer surface 493 of the coupler 490 preferably engages an inner surface of a flared upper portion 432 of a diptube 430, as illustrated in FIG. 7B. A diptube 430 (illustrated in FIG. 7B) arranged for use with the dispensing assembly 400 includes an upper end 432 with a flared portion 435 tapering down at a shoulder 434 to a tubular body that terminates at a lower end 431, with a hollow bore extending from the lower end 431 to the upper end 432. A lateral opening 433 into the bore is defined near the lower end 431. The lower end 431 of the diptube 430 is insertable into a liner of liner-based pressure dispense package, with the lower end 431 of the diptube 430 serving as a liquid extraction opening exposed to the interior volume of the liner.

Referring to FIGS. 7A and 7B in combination, in one embodiment a coupler 490 and diptube 430 are affixed to the lower end 471 of the connector 470, and the combined subassembly (including diptube 430, coupler 490, and connector 470) are inserted together through a breakseal 405 and into the longitudinal bore (e.g., through upper portion 460 and into lower portion 455 of the longitudinal bore) of the liner fitment adapter 450, with the diptube 430 extending through a lower opening 456 defined in the liner fitment adapter 450. A retaining or sealing element 456A may be disposed adjacent to the lower opening 456 to provide structural support and/or sealing engagement for the diptube 430. The ability to insert the diptube 430 and coupler 490 from above (i.e., from outside the pressure dispense package) permits the end user to select a diptube 430 of appropriate dimensions for use with a specific pressure dispense container. After insertion of the diptube 430, coupler 490, and connector 470 into the longitudinal bore, removal of the coupler 490 and diptube 430 may be inhibited by presence of the shoulder 461 that divides the upper portion 460 and lower portion 455 of the longitudinal bore. If the shoulder 461 is minimized, then the diptube 430 and coupler 430 may be removed from above from the dispensing assembly.

In another embodiment, the coupler 490 and diptube 430 may be positioned within the longitudinal bore of the liner fitment adapter 450 prior to insertion of the connector 470 past the breakseal 405 and into the upper portion 460 of the longitudinal bore.

Continuing to refer to FIG. 7A, a laterally protruding edge 461 is provided along an upper portion of the liner fitment adapter 450. Below the laterally protruding edge 461, grooves 466 are provided to receive a circumferential sealing element (e.g., an O-ring) to promote retention between the fitment adapter 450 and a liner fitment or other associated components. Adjacent to the liner fitment adapter 450 a liner fitment (not shown) and collapsible liner (not shown) may be provided.

Disposed above the liner fitment retainer 415 and liner fitment adapter 450 is a closure 410 for a pressure dispensing vessel such as an overpack container (not shown), with the closure 410 including a female threaded surface 411 arranged for mating with a corresponding male threaded neck (not shown) of a pressure dispensing vessel. The closure 410 has an associated male threaded neck 412 that extends upward to receive a threaded socket 402 along a lower portion of a connector body 401. A breakseal 405 is disposed within or adjacent to the threaded neck 412, and preferably includes a rupturable membrane that maintains sealing conditions within a pressure dispense package one or more components (e.g., the connector 470) are inserted through the breakseal 405 to mate with the liner fitment adapter 450. When the connector 470 is inserted into the liner fitment adapter 470, fluidic connections are simultaneously made between (a) the gas extraction conduit 479 and the interior volume of a liner (not shown) mounted to a liner fitment, (b) the liquid extraction conduit 472 and the interior volume of the liner, and (c) the pressurization gas conduit and an interstitial space between an overpack container (not shown) and the liner.

In certain embodiments, multiple temperature sensing elements may be used to detect presence of fluid or change in phase of flowing fluid within a fluid circuit. Use of temperature sensors for fluid detection may be advantageously employed for sensing presence or change in phase of highly opaque liquids (e.g., pigmented color filter materials and used for coating flat panels in the manufacture of display monitors, and similar fluids), since such fluids are generally not amenable to optical detection. Heat may be dissipated into a flowing fluid at a first location, and a first sensing element may be arranged in sensory communication with the first heating element and the fluid, and adapted to generate a first output signal correlative of temperature of the first heating element. In one embodiment, the first heating element and the first sensing element may comprise a single (first) thermistor driven at a first current level sufficient for the first thermistor to be self-heating. A second sensing element may be arranged in sensory communication with the fluid at a second location within the fluid circuit, and adapted to generate a second sensing element output signal correlative of temperature of the fluid at the second location. In one embodiment, the second sensing element comprises a second thermistor driven at a second current level that is substantially lower than the first current level. A signal processing element (e.g., including but not limited to a comparator and an amplifier) may be arranged to receive the first sensing element output signal and the second sensing element output signal, and to determine presence of fluid or change in phase of flowing fluid within the fluid circuit based on comparison of the first sensing element output signal and the second sensing element output signal. Other types of temperature sensing elements (e.g., including but not limited to thermocouples and resistance temperature detectors) may be used in conjunction with at least one separate heating element.

The foregoing apparatus is capable of sensing presence of liquid or gas due to different heat capacities of fluids in liquid or gas phase. A fluid in liquid phase generally has a greater heat capacity than a fluid in gas phase. When a heating element (e.g., including a thermistor) is supplied with electric current at level that exceeds the ability of gas flowing over the heating element to dissipate such heat, then the heating element will exhibit self-heating, its temperature will rise, and such temperature is detectable with a first temperature sensor. When the same heating element operating at the same electric current supply level is exposed to a liquid flowing over the heating element, however, the heating element may not exhibit self-heating if the flowing liquid is able to absorb such heat. A second temperature sensor in sensory communication with the fluid in the same fluid circuit is used for temperature compensation. A difference in temperature between the first temperature sensor and the second temperature sensor is amplified and measured. Detection of a condition corresponding to a self-heating state of the first temperature sensor indicates that the first temperature sensor is exposed to a gas, whereas detection of a condition corresponding to a lack of self-heating state of the first temperature sensor indicates that the first temperature sensor is exposed to a liquid. To account for possible variation in flow rate through the fluid circuit with respect to time, a comparison between first and second temperature sensors may also be compensated with an output of an optional flow rate sensor.

In one embodiment, various components of an apparatus to detect presence of fluid or change in phase of flowing fluid within a fluid circuit (as described above) may be integrated into a single apparatus, such as a connector for a liner-based pressure dispensing container arranged to receive pressurized gas from a gas source to exteriorly apply pressure to a liner for compression thereof, or an apparatus arranged to be placed in a fluid circuit disposed downstream of a fluid dispensing container. In one embodiment, the first sensing element and the second sensing element are arranged in a first apparatus (e.g., a connector for a pressure dispense container) and the signal processing element is arranged in a second apparatus that is physically remote from the first apparatus with appropriate electrical connections therebetween.

In one embodiment, an apparatus adapted to detect presence of fluid or change in phase of flowing fluid within a fluid circuit utilizing first and second temperature sensing elements is adapted to detect change in phase from gas phase to liquid phase of flowing fluid within a fluid circuit (e.g., located downstream of a fluid dispensing container such as a liner-based pressure dispense container).

In one embodiment, an apparatus adapted to detect presence of fluid or change in phase of flowing fluid within a fluid circuit utilizing first and second temperature sensing elements is adapted to detect presence or absence of at least one gas bubble in flowing fluid within the fluid circuit.

In one embodiment, an apparatus adapted to detect presence of fluid or change in phase of flowing fluid within a fluid circuit utilizing first and second temperature sensing elements is utilized in conjunction with at least one other sensing apparatus operating according to different sensing principles (e.g., an optical sensor, a capacitive sensor, or the like), and the signals of such different sensing apparatuses are compared. Utilization of apparatuses operating according to different sensing principles may provide increase reliability and reduce the possibility for dispensing errors.

In one embodiment, a fluid dispensing system includes an apparatus adapted to detect presence of fluid or change in phase of flowing fluid within a fluid circuit utilizing first and second temperature sensing elements and a signal processing element arranged to compare outputs of the first and second temperature sensing elements. Such fluid dispensing system further includes a gas vent, a liquid receiving line in fluid communication with a process tool, and flow control element arranged to selectively admit fluid into the liquid receiving line, wherein the system is adapted to operate the flow control element to admit fluid into the liquid receiving line responsive to receipt of a signal derived from the signal processing element indicative of presence of liquid within the fluid circuit.

In one embodiment, a method for sensing presence of fluid or change in phase of flowing fluid within a fluid circuit utilizes a first thermistor in sensory communication with the fluid at a first location within the fluid circuit and utilizes a second thermistor in sensory communication with the fluid at a second location within the fluid circuit. The first thermistor is driven at a first electrical current level sufficient to cause self-heating of the first thermistor upon exposure of a sensing portion thereof to gas. The second thermistor is driven at a second electrical current level that is substantially lower than the first current level. A first output signal of the first thermistor and a second output signal of the second thermistor are compared (e.g., using a signal processing element, such as may include a comparator and an amplifier) to determine presence of fluid or change in phase of flow fluid within the fluid circuit based on such comparison. In one embodiment, a flow control element is used to selectively control (i) venting of gas from the fluid circuit, and/or (ii) dispensation of fluid from the fluid circuit to a process tool, and such flow control element is controlled responsive to said comparison of the first output signal to the second output signal.

In one embodiment, a fluid circuit is operatively connected to a liner-based pressure dispense container arranged to receive pressurized gas from a gas source to exteriorly apply pressure to a liner for compression thereof, and a method includes controlling dispensation of fluid from the liner-based pressure dispense container to the fluid circuit responsive to a comparison of a first output signal generated by a first temperature sensor to a second output signal generated by a second temperature sensor, wherein the first temperature sensor includes or is associated with heating element arranged to dissipate heat into fluid within the fluid circuit.

Figure 8:
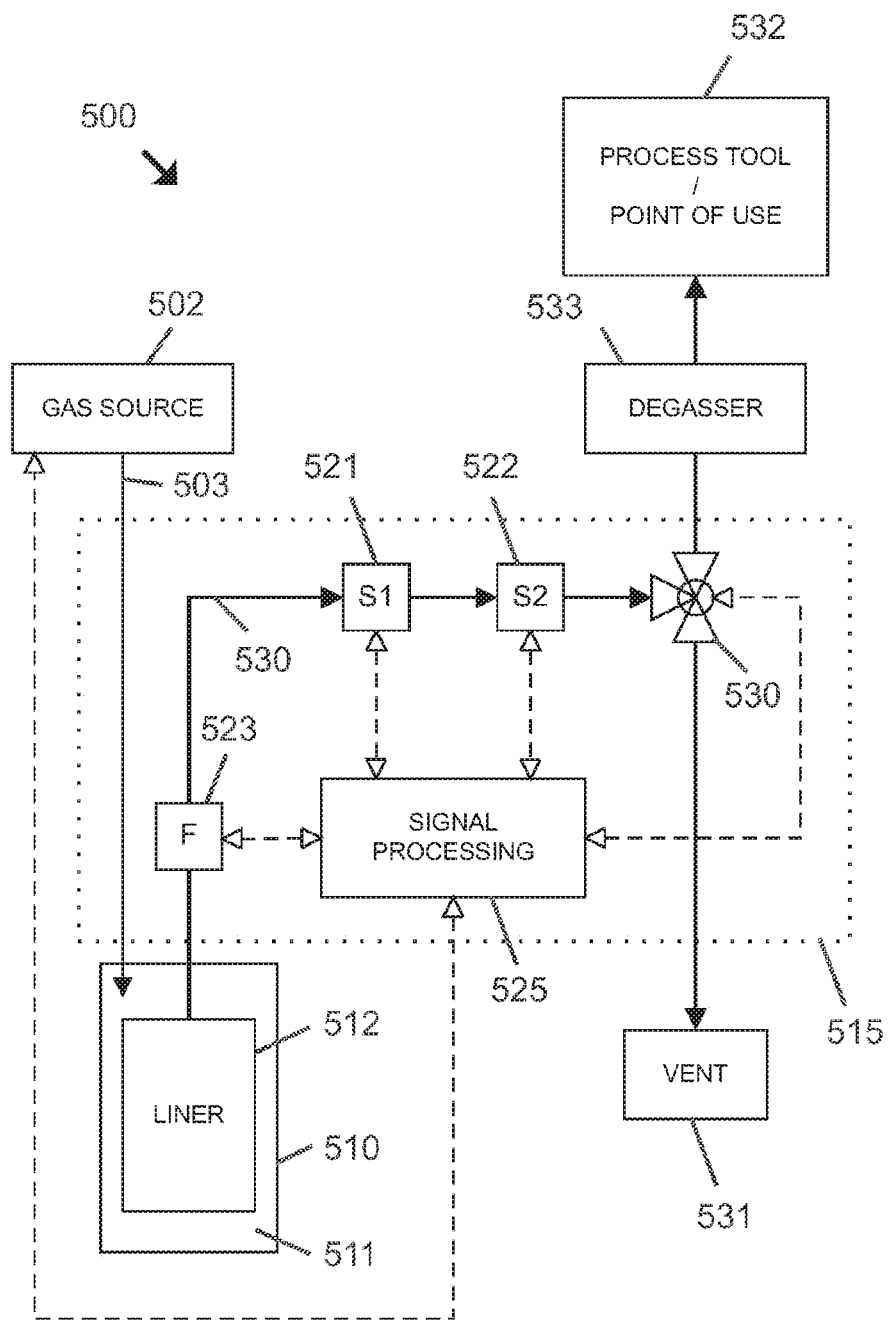
FIG. 8 is a schematic illustrating interconnections between various components of a fluid dispensing system including multiple temperature sensing elements and a signal processing element arranged to determine presence of fluid or change in phase of flowing fluid based on comparison of outputs of the temperature sensing elements.

FIG. 8 is a schematic illustrating interconnections between various components of a fluid dispensing system 500 including multiple temperature sensing elements 521, 522 and a signal processing element 525 arranged to determine presence of fluid or change in phase of flowing fluid in a fluid circuit 530 based on comparison of outputs of the temperature sensing elements 521, 522. Fluid is dispensed into the fluid circuit 530 from a pressure dispense apparatus including an outer container 510 containing a collapsible liner 512 and arranged to receive pressurized gas into an interstitial space 511 between the outer container 510 and the liner 512 from a gas source 502 via a gas supply line 503. When pressurized gas is supplied into the interstitial space 511, such gas applies exterior pressure to the liner 512 for compression thereof, to dispense fluid from the liner 512 into the fluid circuit 530. The fluid circuit 530 may include a flow sensing element 523 to sense flow rate of fluid within the fluid circuit 530. First and second temperature sensing elements (e.g., thermistors) 521, 522 are arranged in sensory communication with fluid in the fluid circuit 530. The various sensing elements 521-523 are in communication with a signal processing element 525, which may also provide control functionality. The signal processing element 525 may comprise a microprocessor, discrete circuit elements, a programmable logic controller, and/or other known elements arranged to receive and process sensory inputs and provide an output signal, optionally arranged to execute a machine-readable instructions such as software. The pressurized gas source 502 may be arranged to receive a signal from the signal processing element 525 for controlling or affecting dispensation of fluid from the liner 512 into the fluid circuit 530. Downstream of the temperature sensing elements 521, 522, at least one flow control element 530 such as one or more valves is arranged to selectively admit fluid to a vent 531 (and/or waste receptacle) or to a process tool or other point of use 532. A degasser 533 may be arranged upstream of the process tool or other point of use 532. The at least one flow control element 530 is arranged to receive a signal from the signal processing element 525 for automatic operation thereof.

In operation of the fluid dispensing system 500, pressurized gas is supplied to the interstitial space 511 between the pressure dispense container 510 and the liner 512 contained therein to compress the liner 512 to cause fluid to be dispensed from the liner into the fluid circuit 530. Fluid contained in the liner 512 may include headspace gas and liquid (e.g., a highly opaque liquid such as pigmented color filter materials or similar fluids), such that fluid dispensed into the fluid circuit may initially be composed primarily of headspace gas. Flow rate of the fluid may be sensed by a flow sensing element 523, and a signal correlative of fluid flow rate may be supplied to the signal processing element 525. One temperature sensing element 521 (e.g., thermistor) is driven at an electric current sufficient to cause self-heating of the sensing element 521 in exposure to gas. A second sensing element 522 (e.g., thermistor) is driven at a substantially lower electric current than the current supplied to the other sensing element 521, so that the second sensing element 522 does not experience self-heating in exposure to gas within the fluid circuit 530. The signal processing element 525 receives and compares signals from the first and second sensing elements 521, 522 to determine whether gas or liquid is present in the fluid circuit 530. When gas is sensed in the fluid circuit 530, the signal processing element 525 generates a signal that is used by the at least one flow control element 530 to admit fluid from the fluid circuit 530 to a vent 531 or waste receptacle. Alternatively, when liquid is sensed in the fluid circuit 530 after initial venting of headspace gas, this may signify that headspace gas has been exhausted and the system 500 is ready for dispensing liquid to the process tool 532 or other point of use, and the flow control element 530 responds to a signal from the signal processing element to admit liquid from the fluid circuit 530 into the process tool 532 or other point of use. Such liquid may flow through an optional degasser 533 for reduction or removal of any gas dissolved or entrained in the liquid. Any one or more of various components of the system 500 (e.g., sensing element(s) 521-523, signal processing element(s) 525, and/or flow control element(s) 530) may optionally be arranged in or on a connector 515 adapted for mating with the pressure dispense container 510. Such connector 515 may embody or contain any one or more additional connector components and/or features as described previously herein.

Figure 9:
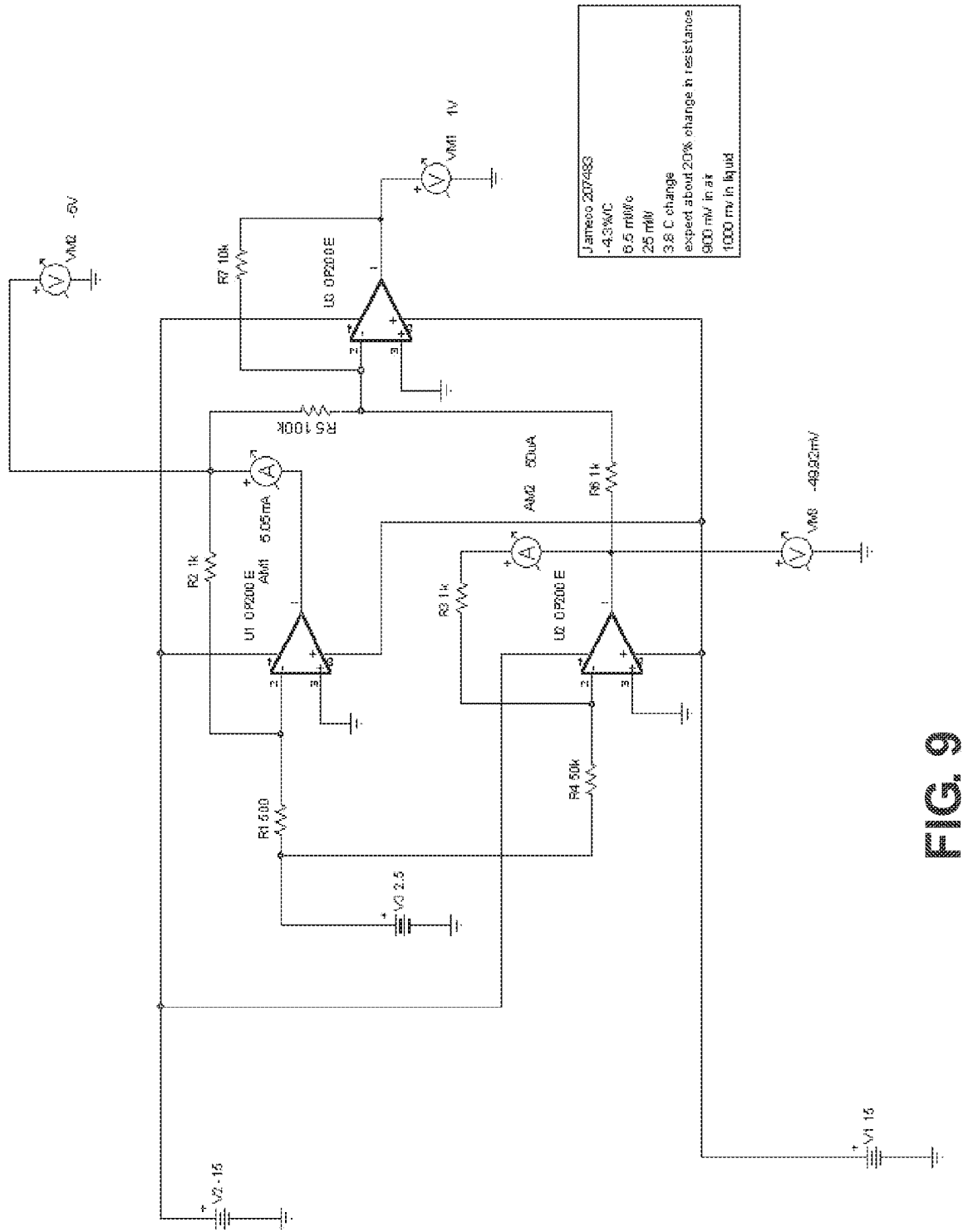
FIG. 9 is a circuit diagram modeling electrical elements of an apparatus for detecting presence of fluid or change in phase of flowing fluid within a fluid circuit, including use of first and second thermistors arrangeable in thermal communication with fluid within the fluid circuit.
Figure 10:
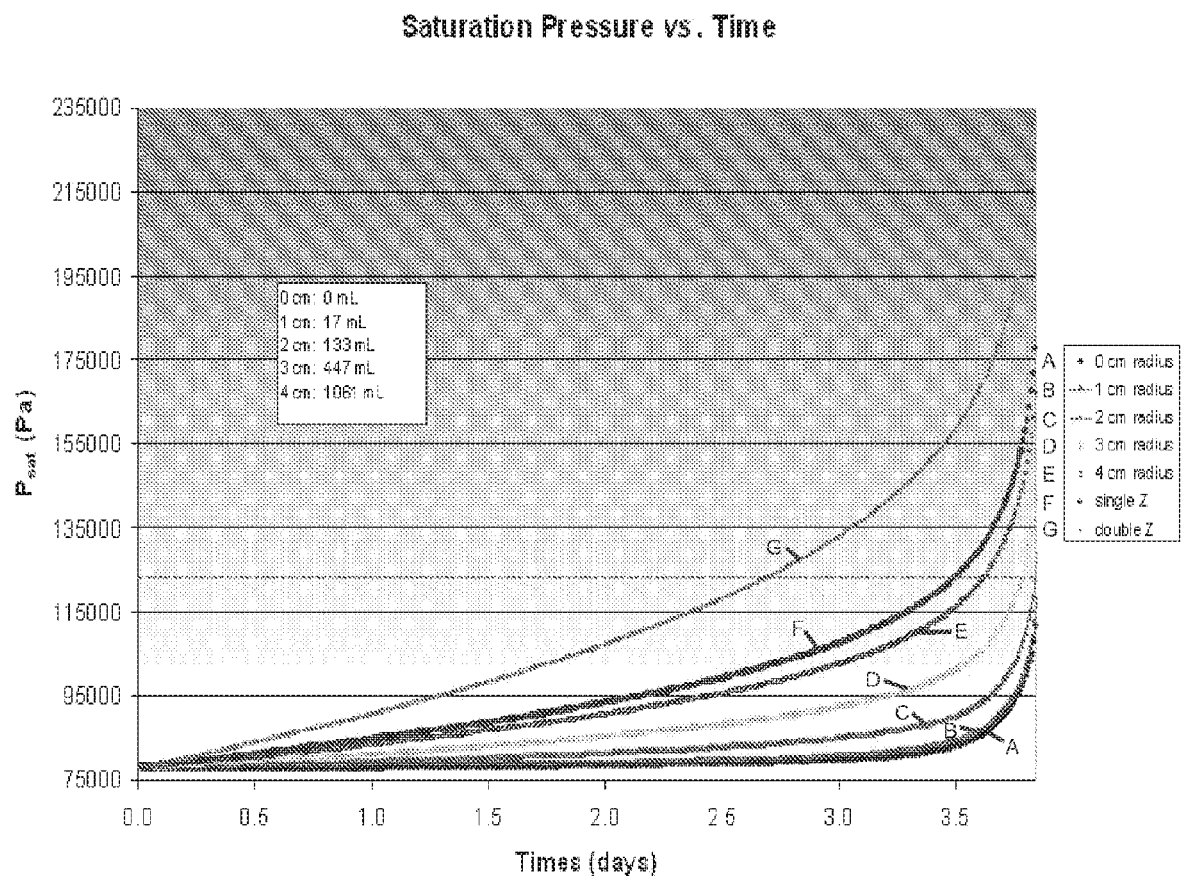
FIG. 10 is a line chart embodying dissolved gas saturation pressure (in Pascals) versus time (in days) for simulations modeling gas released from folds during pressure dispense of fluid from seven different 200 liter collapsible film-based container liners.
Figure 11:
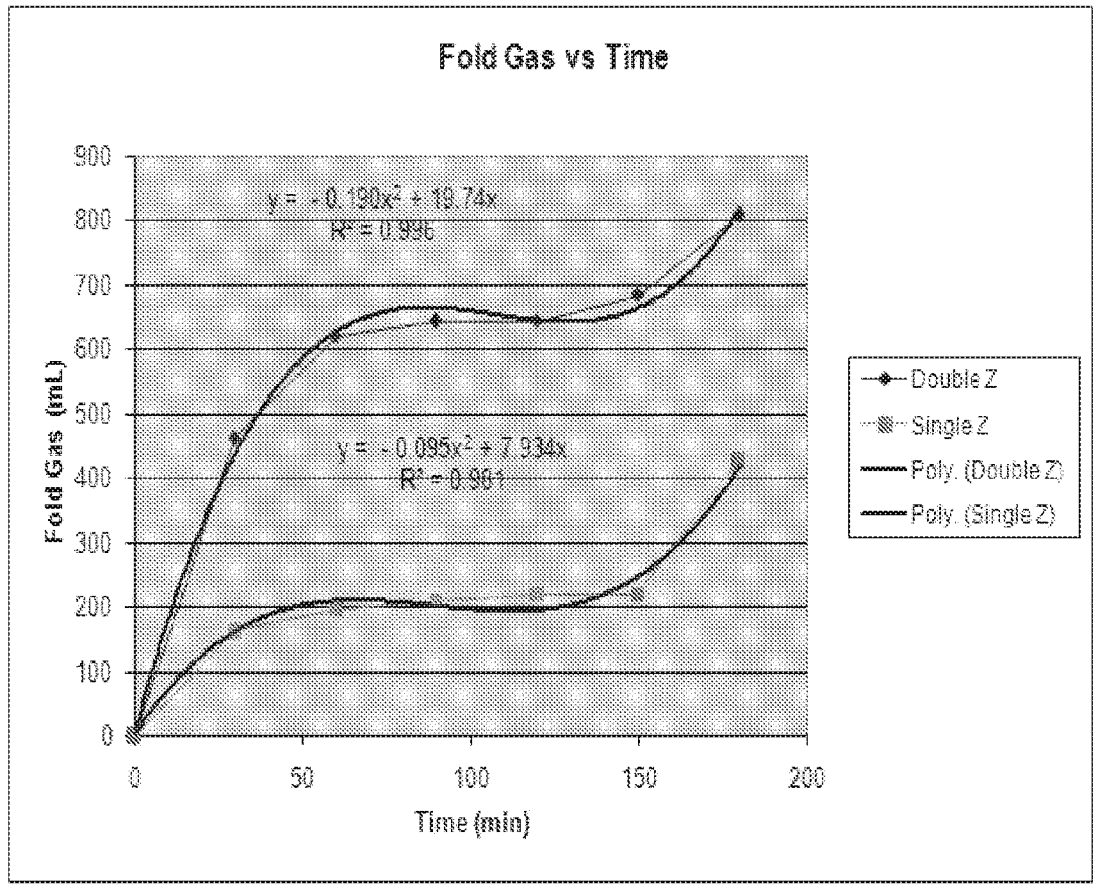
FIG. 11 is a line chart showing release of fold gas (milliliters) as a function of time (minutes) for pressure dispensing of fluid from a first film-based container liner with a single Z-fold configuration and from a second film-based container liner with a double Z-fold configuration.

FIG. 9 is a circuit diagram modeling electrical elements of an apparatus for detecting presence of fluid or change in phase of flowing fluid within a fluid circuit, including use of first and second thermistors arrangeable in thermal communication with fluid within the fluid circuit. Thermistor R2 (e.g., as may be embodied in a Jameco 207483 thermistor (Jameco Electronics, Belmont, Calif.) embodies a first or main temperature sensing element, and is driven with an electric current of 5.05 milliamperes. Characteristics of the Jameco 207483 thermistor are specified as −4.3%/.degree. C. and 6.5 mW/.degree. C. Given the characteristics of the thermistor R2, self-heating of about 3.8 degrees Celsius is expected in exposure of the thermistor R2 to air, but in liquid, such self-heating will be nearly zero due to the much higher heat capacity of the liquid as compared to air. Thermistor R3 (as may comprise the same type as thermistor R2) is driven with an electric current of 50 microamperes, and will have very little self heating in exposure to gas or liquid; this thermistor R3 is used to compensate the signal from the other thermistor R2. The difference between output signals of the two thermistors R2, R3 is amplified using amplifier U3 and measured. In the illustrated simulation, the expected change in signal between gas and liquid is 10% (i.e., about 900 mV in air, and about 1000 mV in liquid), which difference is easily detectable with standard circuit components. As indicated previously, temperature sensing elements of types other than thermistors may be used.

As noted previously, while illustrative embodiments have been described as including liner-based pressure dispense packages, aspects of the present invention may be applied to liner-less package and container systems. In one embodiment, insertion of a connector into a dispensing assembly simultaneously makes fluidic connections between (a) a gas extraction conduit and a dispensing volume within a container; (b) a liquid extraction conduit and the dispensing volume within the container, and (c) a pressurization gas conduit and a space to be pressurized within a pressure dispense vessel, with the gas extraction conduit, liquid extraction conduit, and pressurization gas conduit being distinct from one another.

In certain embodiments, negative effects of gas contacting source material (e.g., liquid) dispensed by a first pressure dispense apparatus be reduced by detecting a condition correlative of dispensation of a desired amount of fluid from, or correlative of an approach to gas saturation of fluid dispensed by, the first pressure dispense apparatus, and responsively combining (e.g., diluting) the output of the first pressure dispense apparatus with fluid dispensed by a second pressure dispense apparatus. The combined fluid stream may be supplied by a dispensation conduit to a desired point of use, such as a tool for processing semiconductors or microelectronic devices. Such combination of fluid streams from multiple pressure dispense apparatuses permits the gas saturation level of fluid (e.g., source material for semiconductor processing and/or microelectronic device processing) to be maintained below acceptable levels. Various conditions that may be sensed (e.g., utilizing one or more sensing elements) as one or more threshold(s) for combining streams output by multiple pressure dispense apparatuses include (but are not limited to) pressure of fluid output by a pressure dispense apparatus, weight of fluid remaining within a pressure dispense apparatus (or, conversely, weight of fluid dispensed by a pressure dispense apparatus), and/or totalized flow of fluid dispensed by a pressure dispensed apparatus.

Preferably, the second pressure dispense apparatus contains less gas (and has a lower ratio of gas to source material (e.g., liquid)) than the first pressure dispense apparatus when the fluid streams output by the first and second pressure dispense apparatuses are combined. At least one ventable reservoir is preferably provided to receive fluid from the first and second pressure dispense apparatuses, to permit separation of gas and liquid upstream of an outlet to a process tool or other desired point of use of the source material (e.g., liquid). In certain embodiments, each pressure dispense apparatus has a dedicated ventable reservoir associated therewith. Use of a dedicated ventable reservoir for each pressure dispense apparatus allows the effect and operational performance of one pressure dispense apparatus to be separated from another pressure dispense apparatus. Each ventable reservoir may include a liquid outlet, a gas outlet, a source material (e.g., liquid) inlet, and a headspace gas inlet, with a control valve preferably associated with each inlet and outlet. A gas outlet may be located above a liquid outlet to permit separation of gas and liquid to be aided by gravity. A desired liquid level within a ventable reservoir may be automatically maintained with outlet control valves operatively coupled with sensors (of any suitable type, such as level sensors, capacitive sensors, conductivity sensors, optical sensors, etc.) arranged to sense presence and/or absence of source material at specified levels within such a reservoir. Each ventable reservoir permits at least periodic venting of gas, such as prior to dispensing of liquid source material (e.g., for headspace removal) and/or during dispensing of liquid source material. In one embodiment, a ventable reservoir comprises a filtration medium adapted to permit passage of liquid but prevent passage of gas bubbles, such as described previously herein. In one embodiment, a ventable reservoir may be physically separated from a pressure dispense container. In another embodiment, a ventable reservoir may be mounted to a pressure dispense container, such as by integration of a reservoir within a cap arranged to mate with such a container.

Streams of fluid discharged by first and second pressure dispense apparatuses may be combined in a tee, in a multi-port valve, or any other suitable flow-combining structure. One or more static and/or dynamic mixers may be used to enhance uniformity of the resulting combined flow. In one embodiment, fluids dispensed by first and second pressure dispense apparatuses have the same composition (e.g., aside from presence of any headspace gas dissolved therein). In another embodiment, fluids dispensed by first and second pressure dispense apparatuses have different compositions.

Streams of fluid discharged by first and second pressure dispense apparatuses may be combined and/or adjusted in any desired proportions. In one embodiment, streams from first and second pressure dispense apparatuses may be combined in roughly equal proportions. In certain embodiments, proportions of fluid in a combined stream including outputs of first and second pressure dispense apparatuses may be altered by adjusting relative dispense pressures of the perspective pressure dispense apparatuses, and/or through use of one or more control valve arranged to regulate flow of one or more fluid streams. In certain embodiments, proportions of fluid in a combined stream including outputs of first and second pressure dispense apparatuses are altered with respect to time. For example, as a first pressure dispense apparatus is nearly depleted of source material (e.g., liquid) and a high concentration of gas is present therein, an increasing percentage of fluid discharged from a second pressure dispense apparatus may be mixed with fluid discharge from the first pressure dispense apparatus to maintain the combined fluid flow at an acceptably low gas saturation level. Proportions of constituent fluid in a combined fluid stream may be adjusted responsive to output of one or more sensors, such as (but not limited to) pressure sensors, weight scales, or flow sensors (including totalized flow sensors).

As the flow rate dispensed from the first pressure dispense apparatus is decreased, the pressurized time for the first pressure dispense apparatus is lengthened. During this lengthened time period, more gas will be dissolved into the small amount of liquid left in the first pressure dispense apparatus (or container thereof) before liquid therein is fully depleted. Depending on the blending starting point, the gas in the first pressure dispense apparatus will continue to be dissolved in the source material (e.g., liquid) until a gas saturation condition is reached. One simple blending algorithm includes the assumption that all remaining source material in the first pressure dispense apparatus is saturated, and such material is blended appropriately with source material from another (e.g., second) pressure dispense apparatus to attain a resulting source material blend that is not saturated with gas under pressure. Other blending algorithms may be employed. In one embodiment, at least one sensor may be used to sense a condition indicative of gas content of liquid remaining in (or liquid dispensed by) the first pressure dispense apparatus, optionally in combination with at least one sensor used to sense a condition indicative of gas content of liquid within (or liquid dispensed by) a second pressure dispense apparatus, with signals from such sensor(s) being used to control blending of streams of source material from the first and second pressure dispense apparatuses. In one embodiment, a signal indicative of gas content of at least one flow of source material is generated with a mass flow sensor and a volumetric flow sensor (optionally corrected by a temperature sensor), with the quotient of mass divided by volume used to determine density of the source material. A functional relationship between density and gas content (or gas saturation condition) may be predetermined empirically, and a measured density signal may be compared to empirical data (or a mathematical function derived from empirical data), with such comparison being used to control blending of source material streams from different containers, and with the object of generating a resulting (blended) source material stream that is not saturated with gas (or maintains a gas content below a specified threshold). In another embodiment, pressure sensing may be used to control proportions of source material streams to produce in a blended source material stream. Other types and/or combinations of sensors as disclosed herein (or as otherwise known to one skilled in the art) may be employed to control blending of source material streams.

Various types of control elements may be utilized with a dispensing apparatus as described herein. The term "control element" may include general purpose or special purpose computers arranged to execute predefined or user-defined instruction sets, programmable logic controllers, signal comparators, control valves, mass flow controllers, pressure regulators, actuators, and the like.

At least one sensing element arranged to generate an output signal correlative of dispensation of a desired amount of fluid from, or correlative of an approach to gas saturation of fluid dispensed by, a first pressure dispense apparatus may include: (A) a pressure transducer arranged to sense pressure of fluid dispensed by a pressure dispense apparatus; (B), a sensor (e.g., a scale, a strain gauge, or the like) arranged to sense weight of (i) fluid contained within an interior volume of a pressure dispensing apparatus, or (ii) the vessel and fluid contained within the vessel of a pressure dispense apparatus; or (C) a flow sensor (such as an integrating flow meter) arranged to sense aggregate volume or aggregate mass of fluid dispensed by a pressure dispense apparatus. Sensing of a condition and generating an output signal may include comparing a signal generated by a sensing element with a predefined value indicative of an amount of fluid to be dispensed from the first pressure dispense apparatus or indicative of a pre-saturation state of fluid dispensed by the first pressure dispense apparatus, to generate the output signal. At least one sensing element may be associated with each pressure dispense apparatus of a dispensing system.

As noted previously, fluid from a first pressure dispensing apparatus is combined with fluid from a second pressure dispensing apparatus upon sensing of a predefined condition correlative of dispensation of a desired amount of fluid from, or correlative of an approach to gas saturation of fluid dispensed by, the first pressure dispense apparatus, and the combined fluid flow is supplied to a desired point of use. After fluid is fully depleted from the first pressure dispensing apparatus, fluid may be dispensed solely from the second pressure dispensing apparatus for some time to the same desired point of use, and the first pressure dispense apparatus may be replenished with fluid (or a third pressure dispense apparatus may be substituted for the first pressure dispense apparatus). Upon sensing of a predefined condition correlative of dispensation of a desired amount of fluid from, or correlative of an approach to gas saturation of fluid dispensed by, the second pressure dispense apparatus, fluid from the second pressure dispense apparatus may be combined with fluid from another pressure dispense apparatus, such as the replenished third pressure dispense apparatus or a third pressure dispense apparatus. As a result, fluid may be supplied on a substantially continuous basis to a desired point of use, while maintaining such fluid at a desirably low gas saturation level. The process of sensing a specified condition associated with one pressure dispense container (or the output thereof) and initiating dispensation from a new pressure dispense container for combining flow of fluids from multiple pressure dispense containers, may be repeated as necessary.

In certain embodiments, a fluid dispensing system includes a first pressure dispense apparatuses with a first collapsible liner arranged to contain fluid therein, and includes a second pressure dispense apparatuses with a second collapsible liner arranged to contain fluid therein. In other embodiments, each pressure dispense apparatus may be devoid of a liner, to permit pressure dispensing by direct contact of pressurized gas with fluid to be dispensed.

Figure 13:
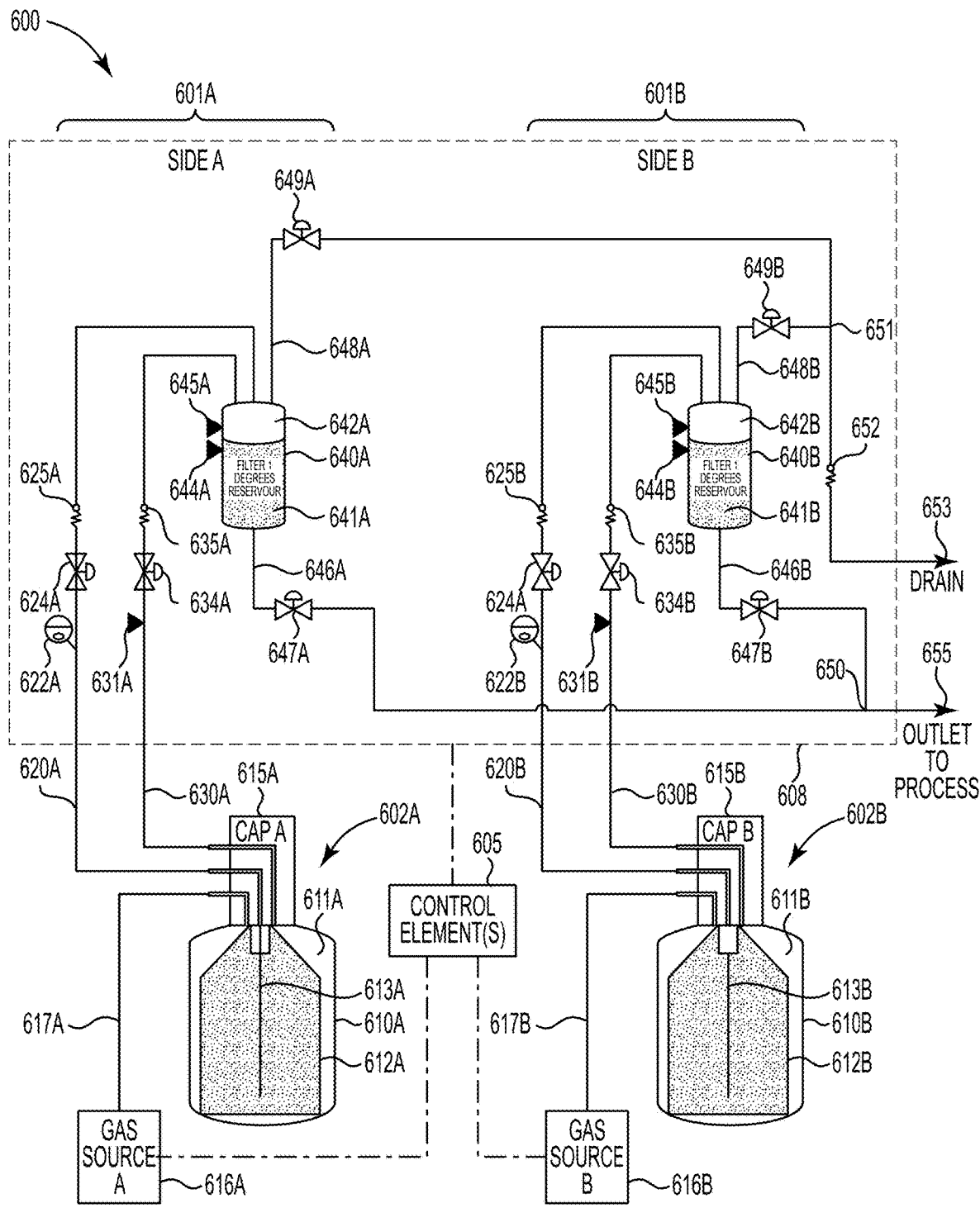
FIG. 13 is a schematic diagram showing interconnections between various components of a fluid dispensing system including first and second fluid dispensing apparatuses each having an associated pressure transducer arranged to monitor dispensed fluid pressure and having a ventable reservoir, with a common outlet receiving combined flows of fluid from the first and the second pressure dispensing apparatuses.

A fluid dispensing system according to one embodiment utilizing pressure sensing to initiate combining of streams from first and second pressure dispense apparatuses is illustrated in FIG. 13. The dispensing system 600 includes a first portion 601A with a first pressure dispense apparatus 602A, first degassing and/or filtering reservoir 640A, and accompanying flow control components, and includes a second portion 602B with a second pressure dispense apparatus 602B, second degassing and/or filtering reservoir 604B, and accompanying flow control components. Each pressure dispense apparatus 602A, 602B includes a substantially rigid container 610A, 610B and a collapsible liner 612A, 612B with an interstitial space 613A, 613B therebetween. Each pressure dispense apparatus 602A, 602B includes a cap 602A, 602B with a gas inlet conduit 617A, 617B (coupled to a pressurized gas source 616A, 616B), a source material (e.g., liquid) outlet conduit 620A, 620B (arranged to receive liquid from a dip tube 613A, 613B within the liner 612A, 612B), and a gas vent conduit 630A, 630B (arranged to vent headspace gas from within the liner 612A, 612B). Each source material (e.g., liquid) outlet conduit 620A, 620B has an associated pressure transducer 622A, 622B, a control valve 624A, 624B, and a check valve 625A, 625B disposed upstream of the reservoir 640A, 640B. Each gas vent conduit 630A, 630B has an associated vent 631A, 631B (which may optionally be coupled to a vacuum source (not shown)), a control valve 634A, 634B, and a check valve 635A, 635B disposed upstream of the reservoir 640A, 640B. Each reservoir 640A, 640B includes an upper portion 642A, 642B receiving the source material outlet conduit 620A, 620B, receiving the gas vent conduit 630A, 630B, and including a downstream gas outlet conduit 648A, 648B leading to a control valve 649A, 649B, a tee 651, an additional gas check valve 652, and a single gas drain 653. Each reservoir 640A, 640B further includes a lower portion 641A, 641B including a liquid outlet 646A, 646B leading to a control valve 647A, 647B, a tee 650, and a single dispensation conduit 655. Sensors 644A, 644B, 645A, 645B associated with the reservoirs 640A, 640B may be used in conjunction with the control valves 647A, 647B, 649A, 649B to maintain a desired liquid level within the reservoirs 640A, 640B. Various components downstream of each pressure dispensing apparatus 602A, 602B may be included in a flow control module 608 that may optionally be located remotely from each pressure dispensing apparatus 602A, 602B. Various elements of the dispensing system 600 (including but not limited to the pressurized gas sources and the flow control module 608) may be operatively coupled to one or more control elements 605, which may include one or more controllers.

In operation of the dispensing system 600, headspace gas initially present in the liner 612 of the first pressure dispense apparatus 602A may be removed through the gas vent conduit 630A, either to a vent 631A or through the filtering and/or degassing reservoir 640A. Gas may also be vented from the liner 612A through the gas vent conduit 630A during liquid dispensing. To initiate pressure dispensing of source material (e.g., liquid) from the first pressure dispense apparatus 602A, pressurized gas is supplied from the first pressurized gas source 616A to the interstitial space 611A between the first container 610A and the first liner 612A. Source material present in the liner 612A is forced through the dip tube 613A into the source material conduit 620A. At such time, the second pressure dispensing apparatus 602B may be idle but ready to initiate dispensing.

Pressure of the dispensed source material is sensed by the pressure transducer 622A, and the source material flows into the first filtering/degassing reservoir 640 (which promotes removal of gas from the source material), and source material flows through outlet conduit 646A and tee 650 to the dispensation conduit 655. A predetermined pressure setpoint for initiating combined dispensing by the first and second dispensing apparatuses may be established empirically, such as by modeling or measuring gas content in source material (or gas saturation condition) as a function of pressure. A setpoint for initiating combined dispensing by multiple pressure dispense apparatuses may be selected at any suitable level, but is preferably establishing at a level corresponding to a source material that has not yet been highly saturated with gas, so that blending of source material streams may be initiated when the source material is in a pre-saturated state to prevent dispensation of saturated source material to a point of use. When the first pressure transducer 622A detects a pressure equaling the setpoint, the transducer 622 generates an output signal that may be used by at least one control element 605 to initiate dispensing of source material (e.g., liquid) by the second dispensing apparatus 602B. Operation of the second dispensing apparatus 602B commences substantially the same as the first dispensing apparatus 602A, with a flow of source material from the second dispensing apparatus 602B flowing through the second filtering/degassing reservoir 640B to merge with a flow of source material from the first pressure dispensing apparatus 602A at the tee 650, whereby the combined streams flow through the single dispensation conduit 655 to a desired point of use. By combining streams of source material from the first and second pressure dispensing apparatuses 602A, 602B, the gas saturation level of the resulting fluid may be maintained below acceptable levels, and greater percentage of fluid may be dispensed with a commensurate reduction in fluid waste.

Figure 14:
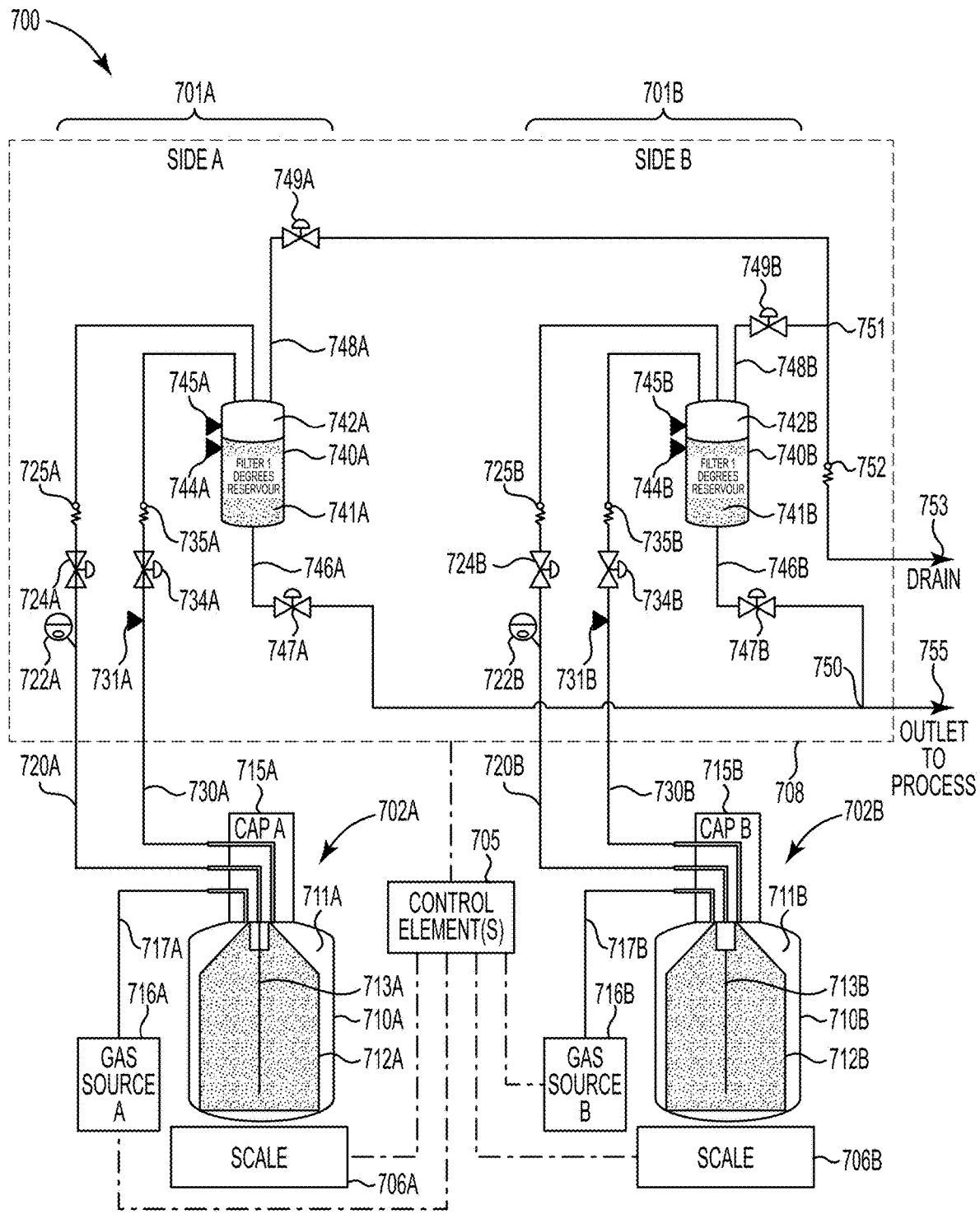
FIG. 14 is a schematic diagram showing interconnections between various components of a fluid dispensing system including first and second fluid dispensing apparatuses each having an associated scale arranged to sense combined container/fluid weight and having a ventable reservoir, with a common outlet receiving combined flows of fluid from the first and the second pressure dispensing apparatuses.

A fluid dispensing system according to one embodiment utilizing weight sensing to initiate combining of streams from first and second pressure dispense apparatuses is illustrated in FIG. 14. The dispensing system 700 includes a first portion 701A with a first pressure dispense apparatus 702A, first degassing and/or filtering reservoir 740A, and accompanying flow control components, and includes a second portion 702B with a second pressure dispense apparatus 702B, second degassing and/or filtering reservoir 704B, and accompanying flow control components. Each pressure dispense apparatus 702A, 702B includes a substantially rigid container 710A, 710B and a collapsible liner 712A, 712B with an interstitial space 713A, 713B therebetween. Weight of each pressure dispense apparatus is sensed with a scale 706A, 706B. Each pressure dispense apparatus 702A, 702B includes a cap 702A, 702B with a gas inlet conduit 717A, 717B (coupled to a pressurized gas source 716A, 716B), a source material (e.g., liquid) outlet conduit 720A, 720B (arranged to receive liquid from a dip tube 713A, 713B within the liner 712A, 712B), and a gas vent conduit 730A, 730B (arranged to vent headspace gas from within the liner 712A, 712B). Each source material (e.g., liquid) outlet conduit 720A, 720B has an associated a control valve 724A, 724B, and a check valve 725A, 725B disposed upstream of the reservoir 740A, 740B. Each gas vent conduit 730A, 730B has an associated vent 731A, 731B (which may optionally be coupled to a vacuum source (not shown)), a control valve 734A, 734B, and a check valve 735A, 735B disposed upstream of the reservoir 740A, 740B. Each reservoir 740A, 740B includes an upper portion 742A, 742B receiving the source material outlet conduit 720A, 720B, receiving the gas vent conduit 730A, 730B, and including a downstream gas outlet conduit 748A, 748B leading to a control valve 749A, 749B, a tee 751, an additional gas check valve 752, and a single gas drain 753. Each reservoir 740A, 740B further includes a lower portion 741A, 741B including a liquid outlet 746A, 746B leading to a control valve 747A, 747B, a tee 750, and a single dispensation conduit 755. Sensors 744A, 744B, 745A, 745B associated with the reservoirs 740A, 740B may be used in conjunction with the control valves 747A, 747B, 749A, 749B to maintain a desired liquid level within the reservoirs 740A, 740B. Various components downstream of each pressure dispensing apparatus 702A, 702B may be included in a flow control module 708 that may optionally be located remotely from each pressure dispensing apparatus 702A, 702B. Various elements of the dispensing system 700 (including but not limited to the pressurized gas sources and the flow control module 708) may be operatively coupled to one or more control elements 705, which may include one or more controllers.

In operation of the dispensing system 700, headspace gas initially present in the liner 712 of the first pressure dispense apparatus 702A may be removed through the gas vent conduit 730A, either to a vent 731A or through the filtering and/or degassing reservoir 740A. Gas may also be vented from the liner 712A through the gas vent conduit 730A during liquid dispensing. To initiate pressure dispensing of source material (e.g., liquid) from the first pressure dispense apparatus 702A, pressurized gas is supplied from the first pressurized gas source 716A to the interstitial space 711A between the first container 710A and the first liner 712A. Source material present in the liner 712A is forced through the dip tube 713A into the source material conduit 720A. At such time, the second pressure dispensing apparatus 702B may be idle but ready to initiate dispensing. Weight of the first pressure dispensing apparatus 702A is sensed by the scale 706A. Source material flows into the first filtering/degassing reservoir 740, and source material flows through outlet conduit 746A and tee 750 to the dispensation conduit 755. As source material is dispensed from the first pressure dispense apparatus 702A, the weight of such apparatus 702A is reduced. A predetermined weight setpoint for initiating combined dispensing by the first and second dispensing apparatuses may be established empirically, such as by modeling or measuring gas saturation as a function of weight of source material remaining in the a pressure dispense container. When the first scale 706A detects a weight equaling the setpoint, the scale 706A generates an output signal that may be used by at least one control element 705 to initiate dispensing of source material (e.g., liquid) by the second dispensing apparatus 702B. Operation of the second dispensing apparatus 702B commences substantially the same as the first dispensing apparatus 702A, with a flow of source material from the second dispensing apparatus 702B flowing through the second filtering/degassing reservoir 740B to merge with a flow of source material from the first pressure dispensing apparatus 702A at the tee 750, whereby the combined streams flow through the single dispensation conduit 755 to a desired point of use. Combining streams of source material from the first and second pressure dispensing apparatuses 702A, 702B permits the gas saturation level of the resulting fluid to be maintained below acceptable levels, and greater percentage of fluid may be dispensed with a commensurate reduction in fluid waste.

Figure 15:
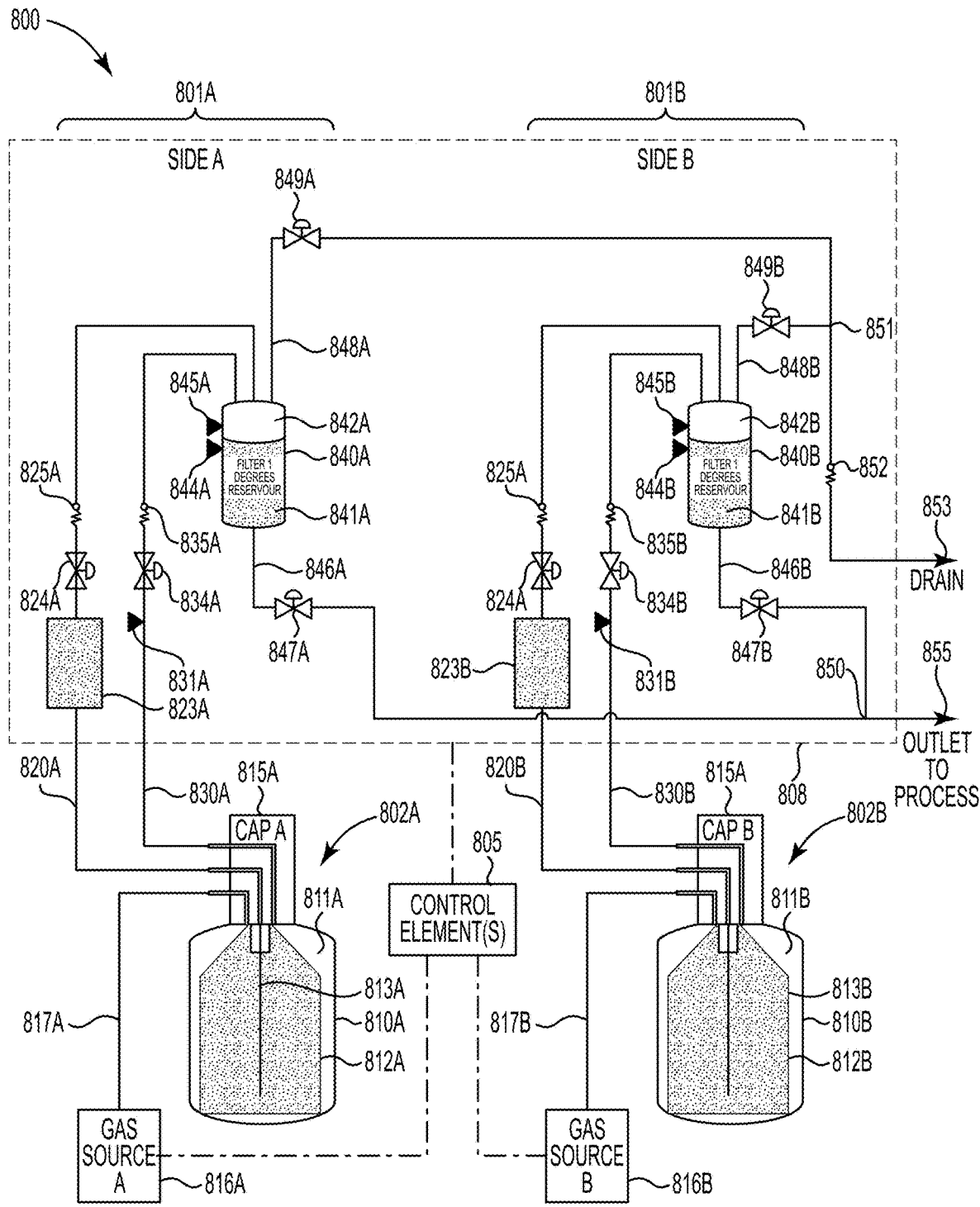
FIG. 15 is a schematic diagram showing interconnections between various components of a fluid dispensing system including first and second fluid dispensing apparatuses each having an associated flow meter and/or flow controller arranged to monitor dispensed fluid flow and having a ventable reservoir, with a common outlet receiving combined flows of fluid from the first and the second pressure dispensing apparatuses.

A fluid dispensing system according to one embodiment utilizing flow sensing to initiate combining of streams from first and second pressure dispense apparatuses is illustrated in FIG. 15. The dispensing system 800 includes a first portion 801A with a first pressure dispense apparatus 802A, first degassing and/or filtering reservoir 840A, and accompanying flow control components, and includes a second portion 802B with a second pressure dispense apparatus 802B, second degassing and/or filtering reservoir 804B, and accompanying flow control components. Each pressure dispense apparatus 802A, 802B includes a substantially rigid container 810A, 810B and a collapsible liner 812A, 812B with an interstitial space 813A, 813B therebetween. Each pressure dispense apparatus 802A, 802B includes a cap 802A, 802B with a gas inlet conduit 817A, 817B (coupled to a pressurized gas source 816A, 816B), a source material (e.g., liquid) outlet conduit 820A, 820B (arranged to receive liquid from a dip tube 813A, 813B within the liner 812A, 812B), and a gas vent conduit 830A, 830B (arranged to vent headspace gas from within the liner 812A, 812B). Each source material (e.g., liquid) outlet conduit 820A, 820B has an associated flow sensor (e.g., totalizing flow sensor) 823A, 823B, a control valve 824A, 824B, and a check valve 825A, 825B disposed upstream of the reservoir 840A, 840B. Each gas vent conduit 830A, 830B has an associated vent 831A, 831B (which may optionally be coupled to a vacuum source (not shown)), a control valve 834A, 834B, and a check valve 835A, 835B disposed upstream of the reservoir 840A, 840B. Each reservoir 840A, 840B includes an upper portion 842A, 842B receiving the source material outlet conduit 820A, 820B, receiving the gas vent conduit 830A, 830B, and including a downstream gas outlet conduit 848A, 848B leading to a control valve 849A, 849B, a tee 851, an additional gas check valve 852, and a single gas drain 853. Each reservoir 840A, 840B further includes a lower portion 841A, 841B including a liquid outlet 846A, 846B leading to a control valve 847A, 847B, a tee 850, and a single dispensation conduit 855. Sensors 844A, 844B, 845A, 845B associated with the reservoirs 840A, 840B may be used in conjunction with the control valves 847A, 847B, 849A, 849B to maintain a desired liquid level within the reservoirs 840A, 840B. Various components downstream of each pressure dispensing apparatus 802A, 802B may be included in a flow control module 808 that may optionally be located remotely from each pressure dispensing apparatus 802A, 802B. Various elements of the dispensing system 800 (including but not limited to the pressurized gas sources and the flow control module 808) may be operatively coupled to one or more control elements 805, which may include one or more controllers.

In operation of the dispensing system 800, headspace gas initially present in the liner 812 of the first pressure dispense apparatus 802A may be removed through the gas vent conduit 830A, either to a vent 831A or through the filtering and/or degassing reservoir 840A. Gas may also be vented from the liner 812A through the gas vent conduit 830A during liquid dispensing. To initiate pressure dispensing of source material (e.g., liquid) from the first pressure dispense apparatus 802A, pressurized gas is supplied from the first pressurized gas source 816A to the interstitial space 811A between the first container 810A and the first liner 812A. Source material present in the liner 812A is forced through the dip tube 813A into the source material conduit 820A. At such time, the second pressure dispensing apparatus 802B may be idle but ready to initiate dispensing. Flow (e.g., totalized flow) of the dispensed source material is sensed by the flow sensor 823A, and the source material flows into the first filtering/degassing reservoir 840 (which promotes removal of gas from the source material), and source material flows through outlet conduit 846A and tee 850 to the dispensation conduit 855. A totalizing flow sensor may be used, or output of a non-totalizing flow sensor may be totalized by a computing device such as may be embodied in the control elements 805. The flow sensor 823A may optionally embody a mass flow controller. A predetermined totalized flow setpoint for initiating combined dispensing by the first and second dispensing apparatuses may be established empirically, such as by modeling or measuring gas saturation as a function of totalized flow. When the first flow sensor 823A detects a totalized flow equaling the setpoint, the sensor 823A generates an output signal that may be used by at least one control element 805 to initiate dispensing of source material (e.g., liquid) by the second dispensing apparatus 802B. Operation of the second dispensing apparatus 802B commences substantially the same as the first dispensing apparatus 802A, with a flow of source material from the second dispensing apparatus 802B flowing through the second filtering/degassing reservoir 840B to merge with a flow of source material from the first pressure dispensing apparatus 802A at the tee 850, whereby the combined streams flow through the single dispensation conduit 855 to a desired point of use. By combining streams of source material from the first and second pressure dispensing apparatuses 802A, 802B, the gas saturation level of the resulting fluid may be maintained below acceptable levels, and greater percentage of fluid may be dispensed with a commensurate reduction in fluid waste.

Figure 12:
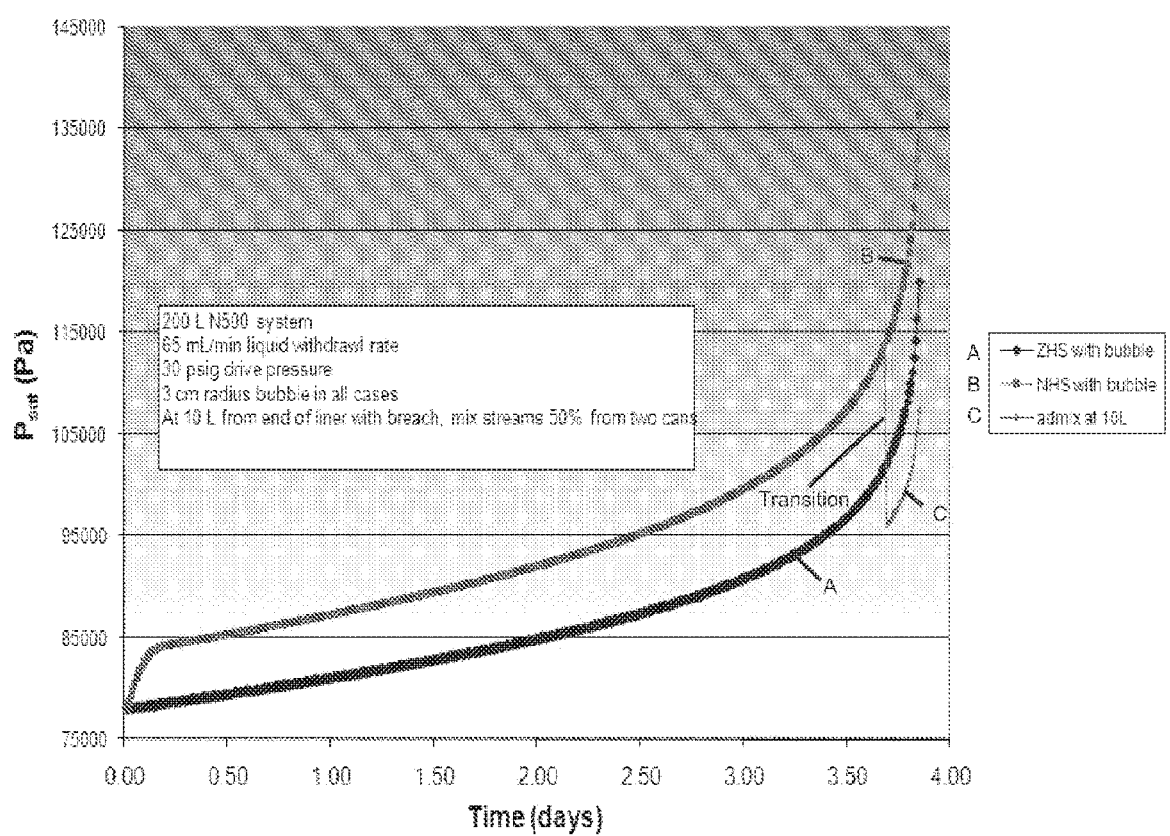
FIG. 12 is a line chart embodying dissolved gas saturation pressure (in Pascals) versus time (in days) for simulations modeling gas released from folds during pressure dispense of fluid from (A) a 200 liter collapsible film-based container liner with zero headspace, (B) a 200 liter collapsible film-based container liner with normal headspace, and (C) a first 200 liter collapsible film-based container liner with normal headspace until a transition at .about.3.7 days, with admixing of fluid dispensed by the first liner with fluid dispensed by a second 200 liter liner thereafter.

FIG. 12 provides comparative results of a simulations including the blending of output streams of first and second pressure dispense apparatuses. An actual system may need to take into account lengthened (e.g., double) pressurization time for both pressure dispense apparatus after blending of source material commences. The modeled system included a 200 liter liner-based pressure dispense apparatus, with a 65 ml/min liquid withdrawal rate, a 30 psig drive pressure, and a 3 cm radius bubble initially present in the liner. FIG. 12 presents dissolved gas saturation pressure (in Pascals) versus time (in days) for simulations modeling gas released from folds during pressure dispense of fluid from (A) a 200 liter collapsible film-based container liner with zero headspace, (B) a 200 liter collapsible film-based container liner with normal headspace, and (C) a first 200 liter collapsible film-based container liner with normal headspace until a transition at .about.3.7 days, with admixing of fluid dispensed by the first liner with fluid dispensed by a second 200 liter liner thereafter. The transition shown at .about.3.7 days (when 10 liters of fluid source material remained in the first liner) represents the initiation of combined dispensing by the first and second pressure dispense apparatuses, with 50% of the resulting combined stream provided by each pressure dispense apparatus. The modeled results show a significant drop in gas saturation pressure of the combined stream starting at the transition, thereby demonstrating efficacy of the inventive system and method in reducing gas saturation levels and enabling dispensation of a greater percentage of source material from a pressure dispense container.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Any one or more features described in connection with one or more embodiment(s) are contemplated to combined with one or more features of any other embodiment(s), unless specifically indicated to the contrary herein. Correspondingly, the invention as hereinafter claimed is intended to be broadly construed and interpreted, as including all such variations, modifications and alternative embodiments, within its spirit and scope.

What is claimed is:

1. A dispensing apparatus comprising:
   a connector including a connector body having a lower portion connectable to a closure of a pressure dispense package, a downwardly extending probe portion, a liquid extraction conduit extending through the connector body and the probe portion and terminating at a lower end of the probe portion, a gas extraction conduit extending through the connector body and the probe portion and terminating at a location above the liquid extraction conduit;
   a fitment; and
   a fitment adapter received within the fitment and having a cup-shaped outer portion and a male inner portion received in the cup-shaped inner portion, the male inner portion having a gas passage and defining a longitudinal bore extending along a first axis, the longitudinal bore having an upper portion configured to receive the downwardly extending probe portion of the connector and a lower portion configured to receive an upper portion of a dip tub therein, wherein when the downwardly extending probe of the connector is received in the fitment adapter, the gas passage of the fitment adapter is in fluid communication with the gas extraction conduit of the connector.

2. The dispensing apparatus of claim 1, wherein the gas passage extends along a second axis that is perpendicular to the first axis of the longitudinal bore defined by the inner portion.

3. The dispensing apparatus of claim 1, wherein the gas extraction conduit is separate and distinct from the liquid extraction conduit.

4. The dispensing apparatus of claim 1, wherein the connector further comprises a gas outlet port in fluid communication with the gas extraction conduit and a liquid outlet port in fluid communication with the liquid extraction conduit.

5. The dispending apparatus of claim 1, wherein the connector further comprises a pressurization gas conduit for introducing a pressurization gas through the connector into a space between a liner and an overpack of a pressure dispense package when the connector is coupled to the closure of the pressure dispense package.

6. The dispending apparatus of claim 1, further comprising a dip tube inserted into the lower portion of the longitudinal bore defined by the male portion of the fitment adapter.

\* \* \* \* \*